(12) United States Patent
Miki et al.

(10) Patent No.: US 12,251,636 B2
(45) Date of Patent: Mar. 18, 2025

(54) INFORMATION PROCESSING SYSTEM, SERVER, AND INFORMATION PROCESSING METHOD FOR PERFORMING EXCHANGE BETWEEN GAMES

(71) Applicants: Nintendo Co., Ltd., Kyoto (JP); The Pokémon Company, Tokyo (JP)

(72) Inventors: Shinnosuke Miki, Kyoto (JP); Noritaka Otsuka, Kyoto (JP); Kazuto Shimizu, Kyoto (JP); Kojiro Taguchi, Kyoto (JP)

(73) Assignees: NINTENDO CO., LTD., Kyoto (JP); THE POKÉMON COMPANY, Tokyo (JP)

( * ) Notice: Subject to any disclaimer, the term of this patent is extended or adjusted under 35 U.S.C. 154(b) by 342 days.

(21) Appl. No.: 17/889,416

(22) Filed: Aug. 17, 2022

(65) Prior Publication Data
US 2023/0191256 A1 Jun. 22, 2023

(30) Foreign Application Priority Data
Dec. 22, 2021 (JP) .................................. 2021-208274

(51) Int. Cl.
*A63F 13/58* (2014.01)
*A63F 13/30* (2014.01)

(52) U.S. Cl.
CPC .............. *A63F 13/58* (2014.09); *A63F 13/30* (2014.09)

(58) Field of Classification Search
None
See application file for complete search history.

(56) References Cited

U.S. PATENT DOCUMENTS

2007/0111802 A1   5/2007   Ishihara et al.

FOREIGN PATENT DOCUMENTS

JP   2007-135791 A   6/2007
JP   2013027525 A  *  2/2017  ........... A63F 13/332

OTHER PUBLICATIONS

Oct. 16, 2023 Office Action issued in Japanese Patent Application No. 2021-208274, pp. 1-7 [machine translation included].

(Continued)

*Primary Examiner* — Lawrence S Galka
(74) *Attorney, Agent, or Firm* — Nixon & Vanderhye, PC

(57) ABSTRACT

An example of a server receives first event data from an information processing apparatus. The server stores therein event management data including event state information that indicates whether a second event has already occurred or has not yet occurred. When receiving a request from the information processing apparatus, the server transmits at least one piece of second event data to the information processing apparatus. The at least one piece of second event data includes second event data based on event management data in which the event state information indicates that the second event has already occurred and/or second event data to be transmitted when the second event data stored in the first storage area is insufficient. Upon receiving the third event data indicating that the second event has occurred, the server updates the event state information so as to indicate that the second event has already occurred.

36 Claims, 18 Drawing Sheets

(56) References Cited

OTHER PUBLICATIONS

[Death Stranding] How many meters does it take for the luggage to be lost? How far away is it okay to keep it?, Enjoy the game moderately [online], Nov. 14, 2019, [Searched on Oct. 11, 2023], http://www.light-gamer.com/entry/inspect-lostdistance-deathstranding, See especially the text. pp. 1-7.

Game System of Death Stranding, Game Strategy Man [online], Dec. 6, 2020, [Searched on Oct. 11, 2023], https://web.archive.org/web/20201206112800/https://dswiipspwikips3.jp/death-stranding/contents/game-system.html, See especially "system of online elements". (It can be said that the webpage had been disclosed at 20:28:00 on Dec. 6, 2020, Japan Standard Time, which corresponds to 11:28:00 on Dec. 6, 2020, Coordinated Universal Time, which can be read from "20201206112800" in the URL.) pp. 1-8.

Starting today Granblue Episode 8 "Multi Battle", Granblue Fantasy [online], Sep. 5, 2017, [Searched on Oct. 12, 2023], https://granbluefantasy.jp/kyogra/?archive=011, See especially "Let's participate in other cavalry and airmen's multi-battles!" pp. 1-4.

* cited by examiner

Fig.10

| FIRST GAME RELATED TO PLAYER CHARACTER A | SECOND GAME RELATED TO PLAYER CHARACTER B |
|---|---|
| (A) PLAYER CHARACTER A IS DEFEATED AND LOSES ITEM (LOSS EVENT).<br><br>221<br>A IS DEFEATED. A LOSES ITEM. | |
| | (B) PLAYER CHARACTER B PICKS UP ITEM (PICK-UP EVENT)<br><br>222<br>ITEM IS PICKED UP, AND SENT TO A. |
| (C) LOST ITEM IS RECOVERED.<br><br>223<br>LIST OF LOST ITEMS<br>LOST ITEM IN FIELD<br>THANK YOU B! | |

INFORMATION PROCESSING SYSTEM, SERVER, AND INFORMATION PROCESSING METHOD FOR PERFORMING EXCHANGE BETWEEN GAMES

CROSS-REFERENCE TO RELATED APPLICATION

This application claims priority to Japanese Patent Application No. 2021-208274, filed on Dec. 22, 2021, the entire contents of which are incorporated herein by reference.

FIELD

The technique shown here relates to an information processing system, a server, and an information processing method which allow communication related to a game between an information processing apparatus and a server.

BACKGROUND AND SUMMARY

Conventionally, there is a game system in which, when a player character has been defeated in a first game performed in a game apparatus, this player character can be helped by performing a game based on saved data of the first game, in a second game different from the first game.

In the above game system, if exchange between the two games (in the above example, to help a player character in another game) is desired to be frequently performed, opportunities for such exchange may become insufficient.

Therefore, the present application discloses an information processing system, a server, and an information processing method capable of effectively providing players with opportunities of performing exchange between games.

(1) An example of an information processing system described in the present application includes at least a plurality information processing apparatuses and a server. Each information processing apparatus is configured to: execute game processing for controlling a player character in a virtual space, based on an operation input performed by a player; when a first event has occurred during a game, set the player character in a state where the player character loses a property, and transmit, to the server, first event data including at least position information and player information regarding the player, the position information being set based on a position, in the virtual space, at which the first event has occurred; receive, from the server, second event data including at least the position information and the player information based on the first event data, of another player, transmitted from another information processing apparatus; enable a second event to occur based on an operation performed by the player, at a position, in the virtual space, which is set based on the position information included in the second event data; and based on the occurrence of the second event, transmit third event data indicating that the second event has occurred, to the server. The server being configured to: store, in a first storage area, event management data including at least the position information, the player information, and event state information, for each first event data received from the information processing apparatus, the event state information indicating whether the second event has already occurred or has not yet occurred; when receiving the third event data from the information processing apparatus, update the event state information in the event management data so as to indicate that the second event has already occurred; store, in a second storage area, at least any event management data in which the event state information indicates that the second event has already occurred; and when receiving a second event data reception request from the information processing apparatus, transmit at least one piece of the second event data to the information processing apparatus. The at least one piece of the second event data includes the second event data based on the event management data which is stored in the first storage area and in which the event state information indicates that the second event has not yet occurred, and/or the second event data which is based on the event management data stored in the second storage area and is to be transmitted when the second event data stored in the first storage area is insufficient. When the first event data has already been transmitted, the information processing apparatus communicates with the server, and when the event state information in the event management data regarding the first event data indicates that the second event has already occurred, the information processing apparatus performs a process of restoring at least a part of the property from the lost state.

According to the configuration of the above (1), opportunities of the second event corresponding to the first event can be secured, thereby effectively providing the players with opportunities of performing exchange between games.

(2) The server may perform a communication for notifying the information processing apparatus that a second event corresponding to the first event data transmitted by the information processing apparatus has already occurred, and thereafter, delete, from the first storage area, event management data regarding the first event data.

According to the configuration of the above (2), the amount of the event management data stored in the first storage area can be reduced.

(3) When the server has received the second event data reception request from the information processing apparatus, the server may transmit at least a predetermined number of the second event data to the information processing apparatus.

According to the configuration of the above (3), the information processing apparatus can perform the game by using a plurality of pieces of second event data.

(4) When the server has received the second event data reception request from the information processing apparatus, then if the event management data regarding a player who has made friend registration with the player of the information processing apparatus is stored in the first storage area, the server may transmit, to the information processing apparatus, the at least one piece of the second event data including the second event data based on the event management data regarding the player who has made the friend registration.

According to the configuration of the above (4), a player who is a friend of the player of the game in which the first even has occurred can be easily provided with opportunities of the second event corresponding to the first event.

(5) When the server has received the second event data reception request from the information processing apparatus, then if the event management data regarding the player who has made friend registration with the player of the information processing apparatus is stored in the first storage area, the server may transmit, to the information processing apparatus, a first number, at maximum, of the second event data regarding the player who has made the friend registration, and transmits a second number of the second event data regarding a player different from the player who has made the friend registration.

According to the configuration of the above (5), a player can be provided with opportunities of performing the second event corresponding to the first event performed by a player who is a friend of the player. Moreover, even when a player has no friend player, it is possible to easily provide this player with opportunities of performing the second event by a predetermined number of second event data being transmitted to the information processing apparatus.

(6) When the server has received the second event data reception request from the information processing apparatus, the server may transmit, to the information processing apparatus, the second event data based on at least one piece of event management data selected at random from among a plurality of pieces of the event management data which are stored in the first storage area and in which the event state information indicates that the second event has not yet occurred.

According to the configuration of the above (6), it is possible to secure opportunities of generating the second event corresponding to the first event for which the second event has not yet occurred.

(7) When the server has received the second event data reception request from the information processing apparatus, the server may transmit, to the information processing apparatus, at least one piece of the second event data that is selected, in chronological order of storage into the server, from among a plurality of pieces of the event management data which are stored in the first storage area and in which the event state information indicates that the second event has not yet occurred.

According to the configuration of the above (7), it is possible to cause the second event to be more readily performed for the first event having a longer time elapsed from its occurrence.

(8) The event management data may further include information regarding the player who has caused the second event. The server may store, as the information regarding the player who has causes the second event, information regarding a player of the information processing apparatus that has firstly transmitted the third event data to the server.

According to the configuration of the above (8), the information processing system can allow a plurality of players to perform the second event for one first event, and can store information regarding the player who has firstly performed the second event for the first event.

(9) The second event data may further include the event state information. When the second event has occurred and the event state information of the second event data associated with the second event indicates that the second event has not yet occurred, the information processing apparatus may transmit the third event data to the server.

According to the configuration of the above (9), even when the second event has occurred, if the event state information of the second event data associated with the second event indicates that the second event has already occurred, the third event data is not transmitted to the server. Therefore, reduction in data traffic from the information processing apparatus to the server can be achieved.

(10) The first event may be an event in which the player character loses the property.

According to the configuration of the above (10), as for the event in which the player character loses the property, opportunities of performing exchange between games can be effectively given to the players.

(11)
The second event may be an event in which, at a position, in the virtual space, indicated by the position information included in the second event data received by the information processing apparatus. The player character may correspond to the information processing apparatus picks up a property that the player character of the another player regarding the second event data has lost.

According to the configuration of the above (11), with respect to the event in which a certain player character loses an property, another player character performs the event of picking up the property, thereby providing a game in which the players cooperate with each other.

(12) The first event may occur when health set on the player character is lost.

According to the configuration of the above (12), even in the game that is less likely to cause the first event in which the health set on the player character is lost, it is possible to increase opportunities of the second event to be performed in the information processing apparatus.

The present specification discloses examples of the information processing apparatus or the server according to the above (1) to (12). Furthermore, the present specification discloses an example of a non-transitory computer-readable storage medium having stored therein an information processing program (e.g., game program) that causes a computer to execute a part or the entirety of the processes executed in the above (1) to (12). Moreover, the present specification discloses an example of an information processing method (e.g., game processing method) for performing the processes in the above (1) to (12) by the information processing system.

According to the information processing system, the server, or the information processing method, the players can be effectively provided with opportunities of performing exchange between games.

These and other objects, features, aspects and advantages of the exemplary embodiment will become more apparent from the following detailed description when taken in conjunction with the accompanying drawings.

BRIEF DESCRIPTION OF THE DRAWINGS

FIG. 10 shows an example of a flow of recovering an item lost in a game;

DETAILED DESCRIPTION OF NON-LIMITING EXAMPLE EMBODIMENTS

1. Configuration of Game System

A game system according to an example of an exemplary embodiment is described below. An example of a game system 1 according to the exemplary embodiment includes a main body apparatus (an information processing apparatus; which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies (see FIG. 2). Hereinafter, first, the hardware configuration of the game system 1 according to the exemplary embodiment is described, and then, the control of the game system 1 according to the exemplary embodiment is described.

Figure 1:
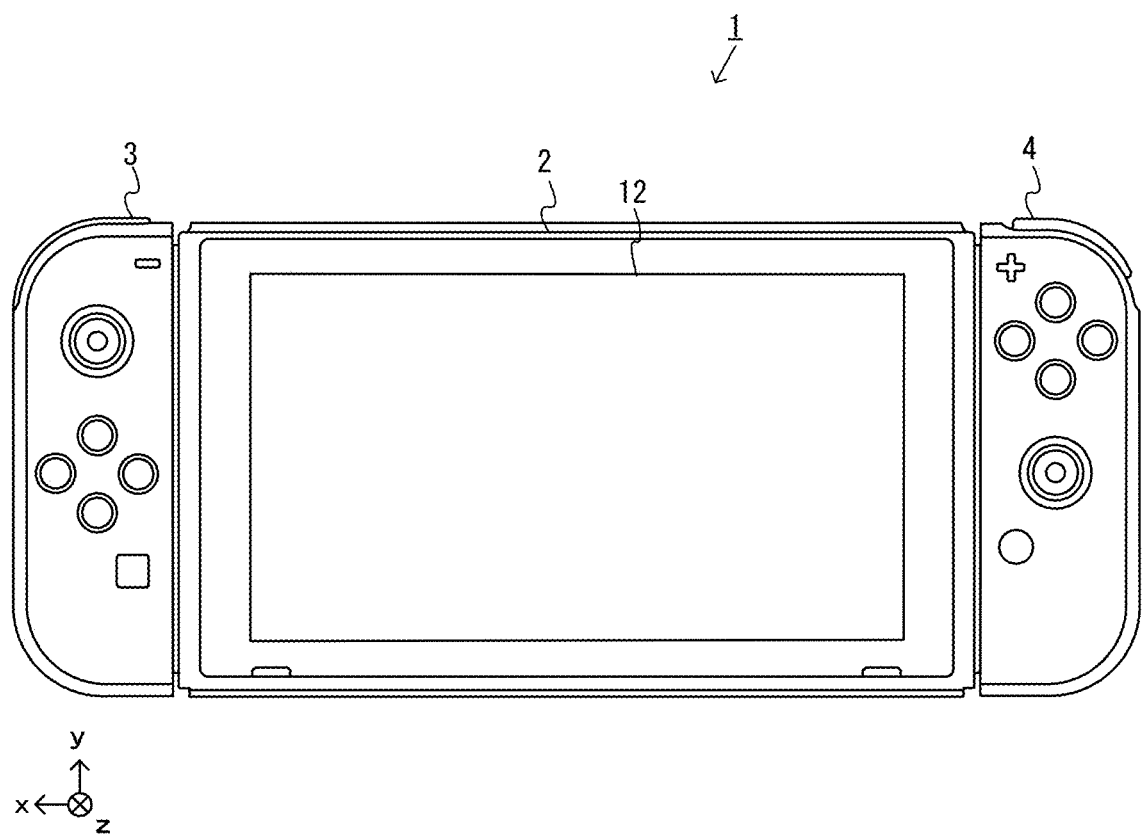
FIG. 1 is a view showing an example where a non-limiting left controller and a non-limiting right controller are attached to a non-limiting main body apparatus.

FIG. 1 is a diagram showing an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 2:
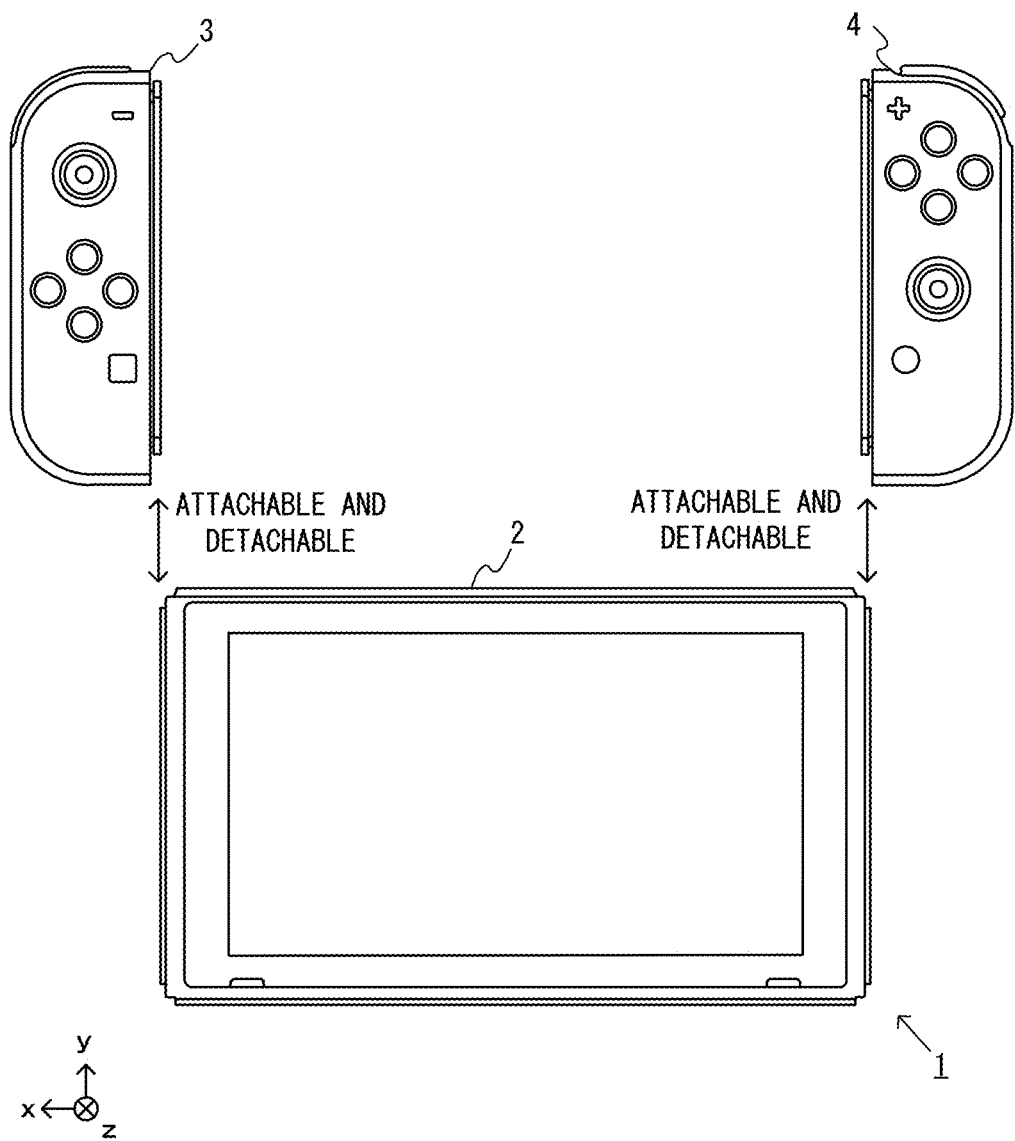
FIG. 2 is a view showing an example where a non-limiting left controller and a non-limiting right controller are removed from a non-limiting main body apparatus.

FIG. 2 is a diagram showing an example of the state where each of the left controller 3 and the right controller 4 is detached from the main body apparatus 2. As shown in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller".

Figure 3:
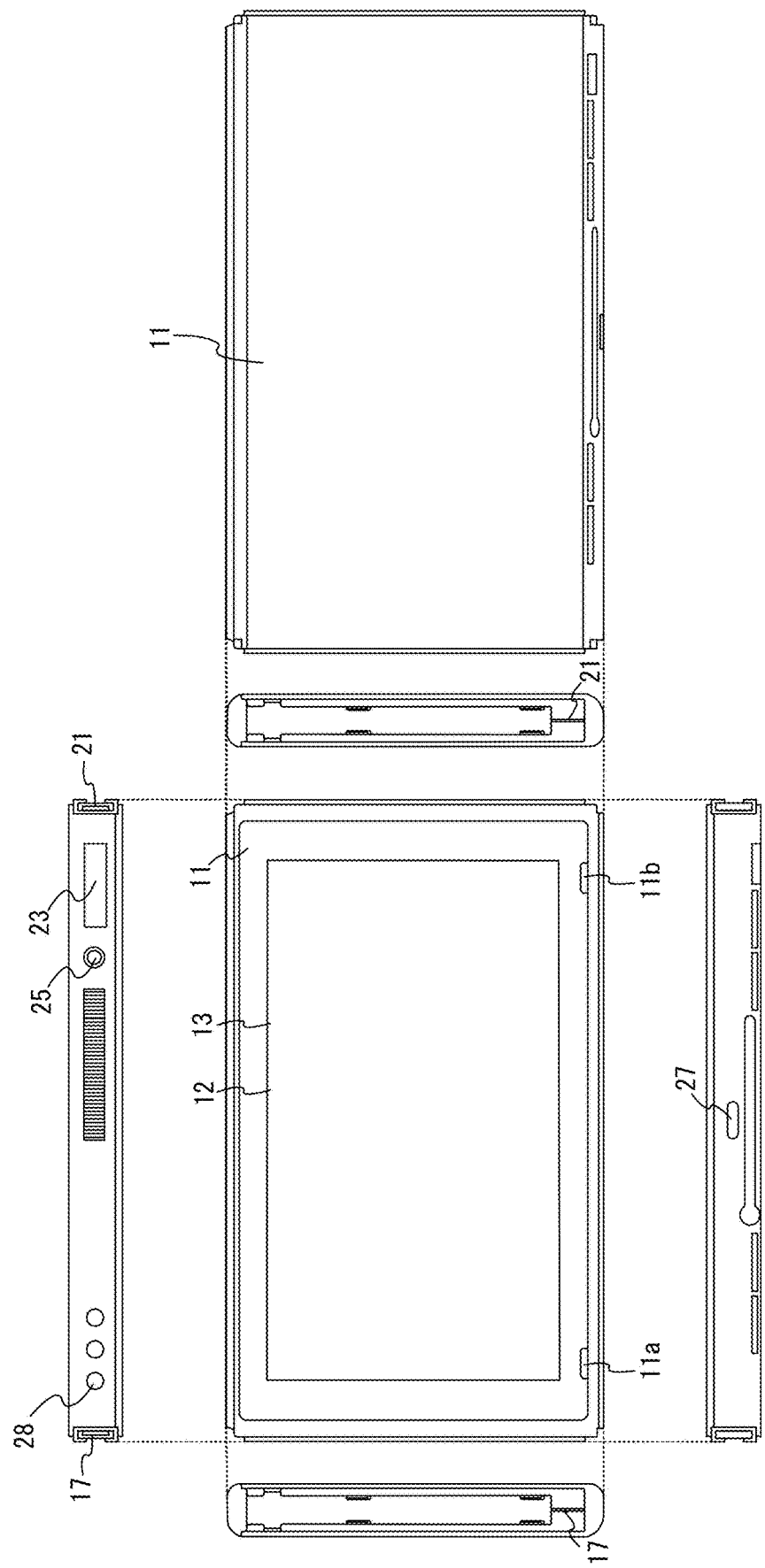
FIG. 3 is a six-sided view showing an example of a non-limiting main body apparatus.

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a generally rectangular shape.

It should be noted that the shape and the size of the housing 11 are optional. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

Further, the main body apparatus 2 includes a touch panel 13 on a screen of the display 12. In the exemplary embodiment, the touch panel 13 is of a type that allows a multi-touch input (e.g., a capacitive type). The touch panel 13, however, may be of any type. For example, the touch panel 13 may be of a type that allows a single-touch input (e.g., a resistive type).

The main body apparatus 2 includes speakers (i.e., speakers 88 shown in FIG. 6) within the housing 11. As shown in FIG. 3, speaker holes 11a and 11b are formed on the main surface of the housing 11. Then, sounds output from the speakers 88 are output through the speaker holes 11a and 11b.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is a terminal for the main body apparatus 2 to communicate with a cradle. In the exemplary embodiment, the lower terminal 27 is a USB connector (more specifically, a female connector). Further, when the unified apparatus or the main body apparatus 2 alone is mounted on the cradle, the game system 1 can display on a stationary monitor an image generated by and output from the main body apparatus 2. Further, in the exemplary embodiment, the cradle has the function of charging the unified apparatus or the main body apparatus 2 alone mounted on the cradle. Further, the cradle has the function of a hub device (specifically, a USB hub).

Figure 4:
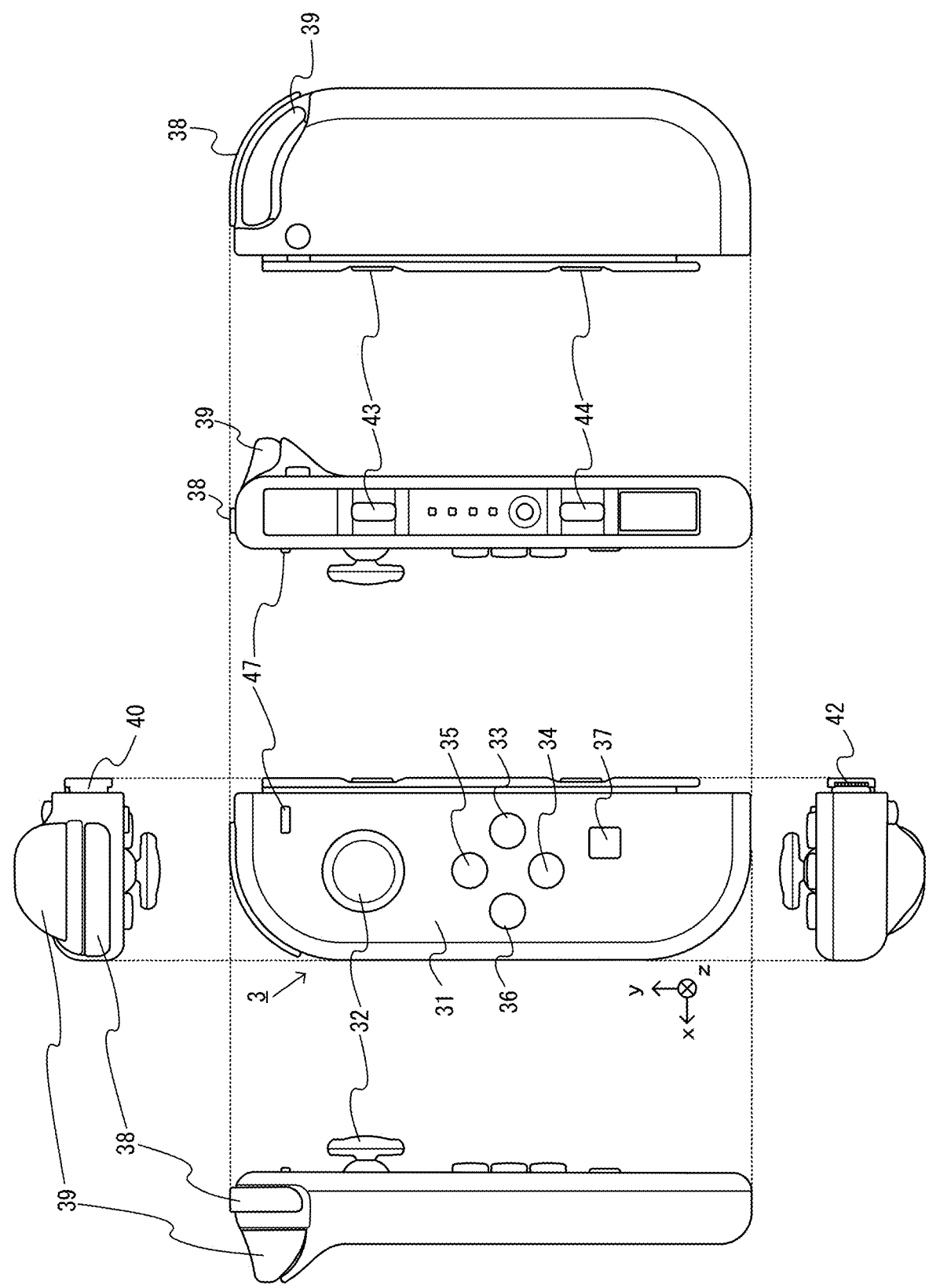
FIG. 4 is a six-sided view showing an example of a non-limiting left controller.

FIG. 4 is six orthogonal views showing an example of the left controller 3. As shown in FIG. 4, the left controller 3 includes a housing 31. In the exemplary embodiment, the housing 31 has a vertically long shape, i.e., is shaped to be long in an up-down direction (i.e., a y-axis direction shown in FIGS. 1 and 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As shown in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the exemplary embodiment, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

Figure 5:
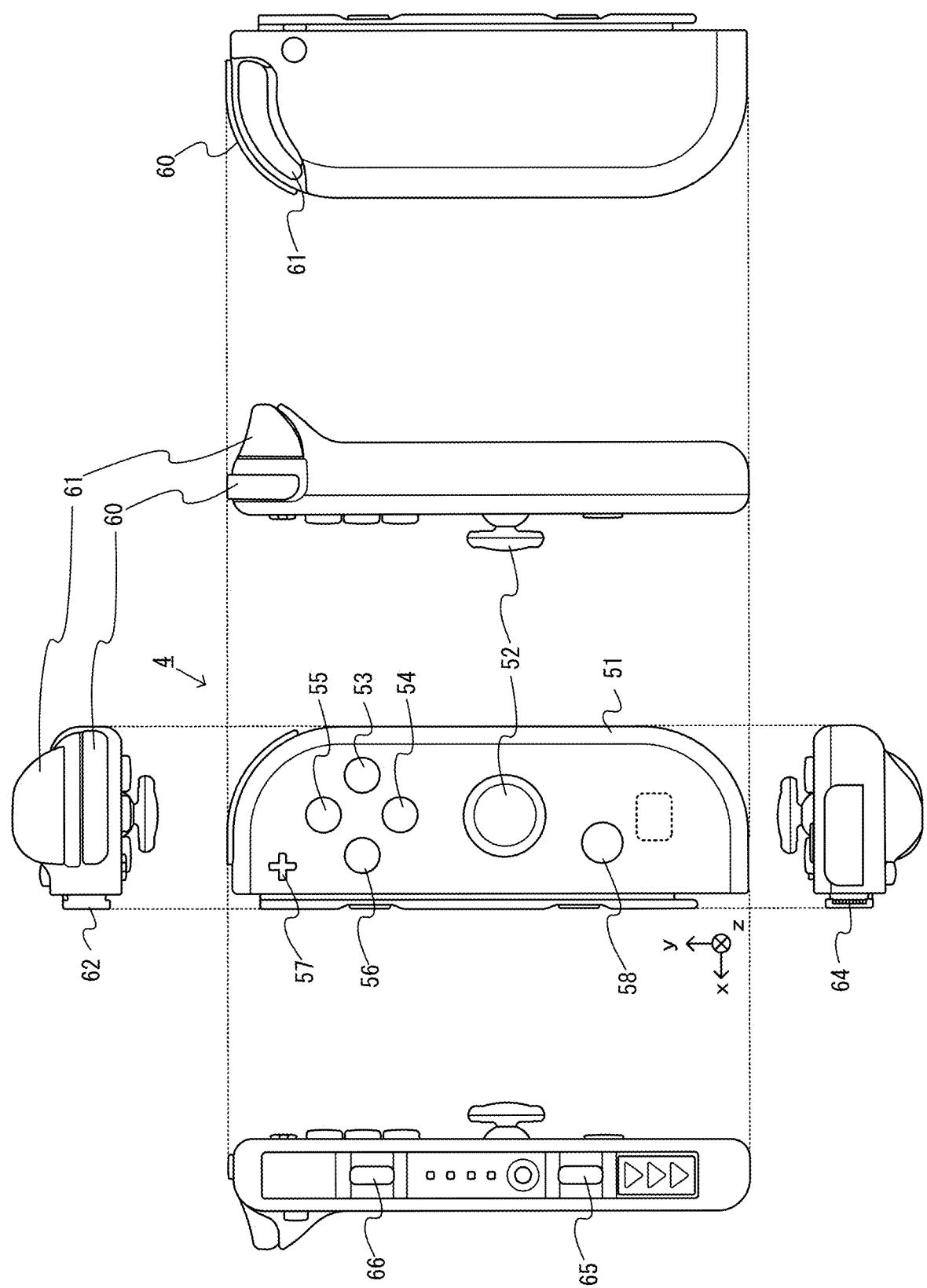
FIG. 5 is a six-sided view showing an example of a non-limiting right controller.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the exemplary embodiment, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51.

Further, similarly to the left controller 3, the right controller 4 includes a second L-button 65 and a second R-button 66.

Further, the right controller 4 includes a terminal 64 for the right controller 4 to perform wired communication with the main body apparatus 2.

Figure 6:
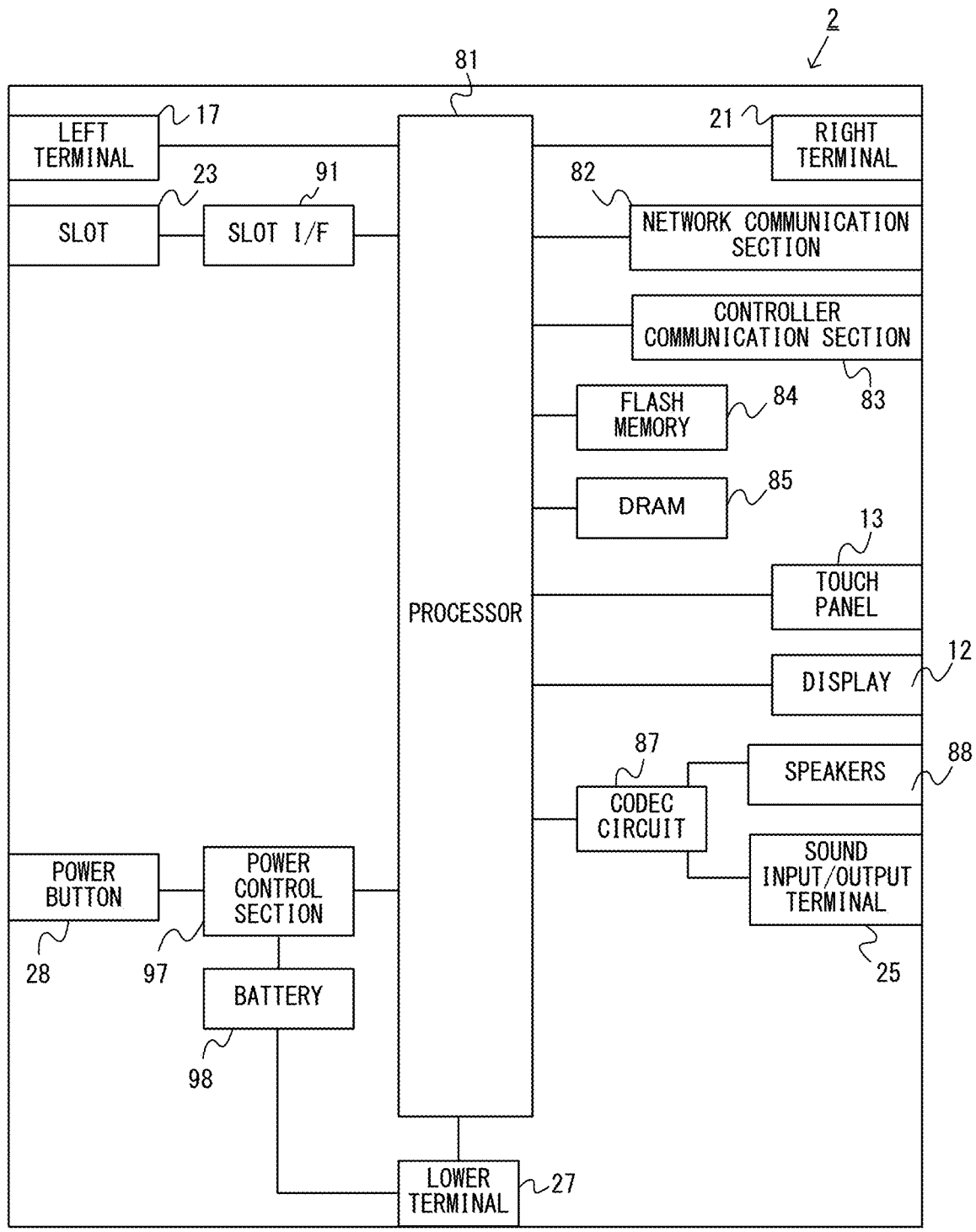
FIG. 6 is a block diagram showing an example of an internal configuration of a non-limiting main body apparatus.

FIG. 6 is a block diagram showing an example of the internal configuration of the main body apparatus 2. The main body apparatus 2 includes components 81 to 85, 87, 88, 91, 97, and 98 shown in FIG. 6 in addition to the components shown in FIG. 3. Some of the components 81 to 85, 87, 88, 91, 97, and 98 may be mounted as electronic components on an electronic circuit board and accommodated in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

Further, the display 12 is connected to the processor 81. The processor 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

The main body apparatus 2 includes a power control section 97 and a battery 98. The power control section 97 is connected to the battery 98 and the processor 81. Further, although not shown in FIG. 6, the power control section 97 is connected to components of the main body apparatus 2 (specifically, components that receive power supplied from the battery 98, the left terminal 17, and the right terminal 21). Based on a command from the processor 81, the power control section 97 controls the supply of power from the battery 98 to the above components.

Further, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

Figure 7:
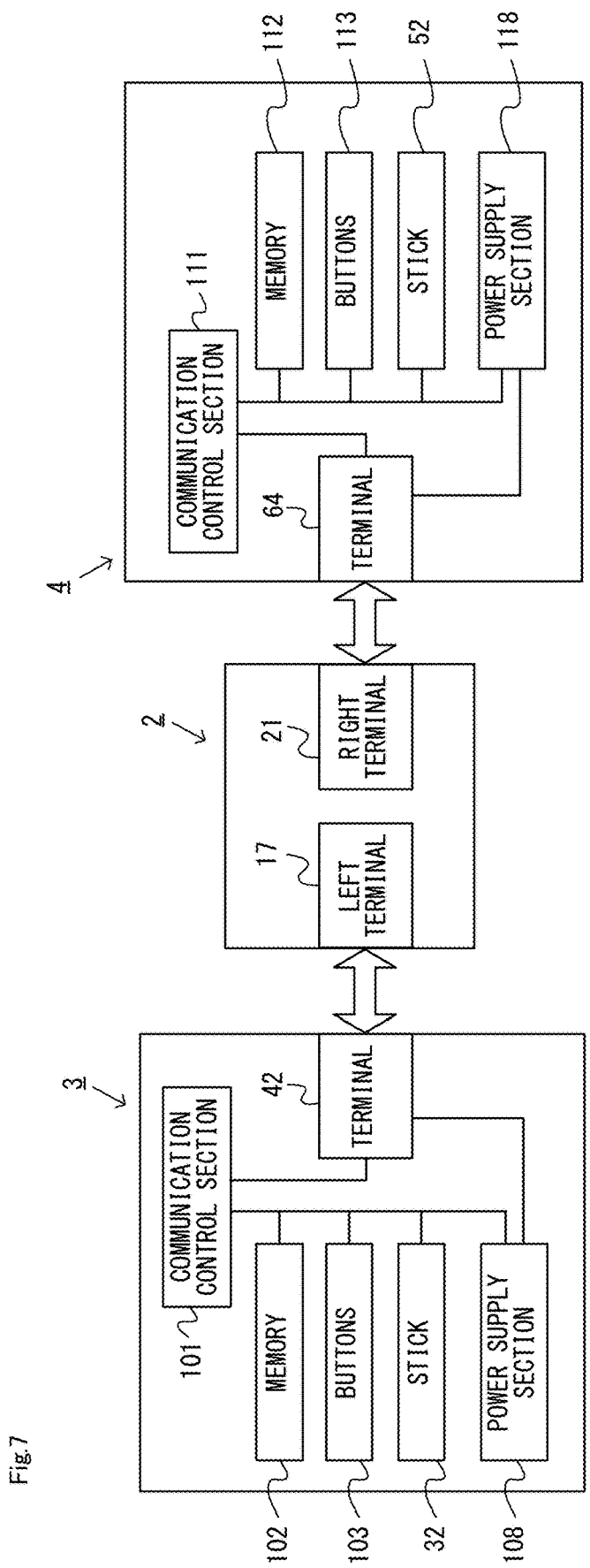
FIG. 7 is a block diagram showing an example of an internal configuration of a non-limiting main body apparatus, a non-limiting left controller and a non-limiting right controller.

FIG. 7 is a block diagram showing examples of the internal configurations of the main body apparatus 2, the left controller 3, and the right controller 4. It should be noted that the details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 7) 32. Each of the buttons 103 and the analog stick 32 outputs information regarding an operation performed on itself to the communication control section 101 repeatedly at appropriate timing.

The communication control section 101 acquires information regarding an input (specifically, information regarding an operation or the detection result of the sensor) from each of input sections (specifically, the buttons 103 and the analog stick 32). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data.

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113 and the analog stick 52. These input sections have functions similar to those of the input sections of the left controller 3 and operate similarly to the input sections of the left controller 3.

The right controller 4 includes a power supply section 118. The power supply section 118 has a function similar to that of the power supply section 108 of the left controller 3 and operates similarly to the power supply section 108.

2. Configuration of Information Processing System

Figure 8:
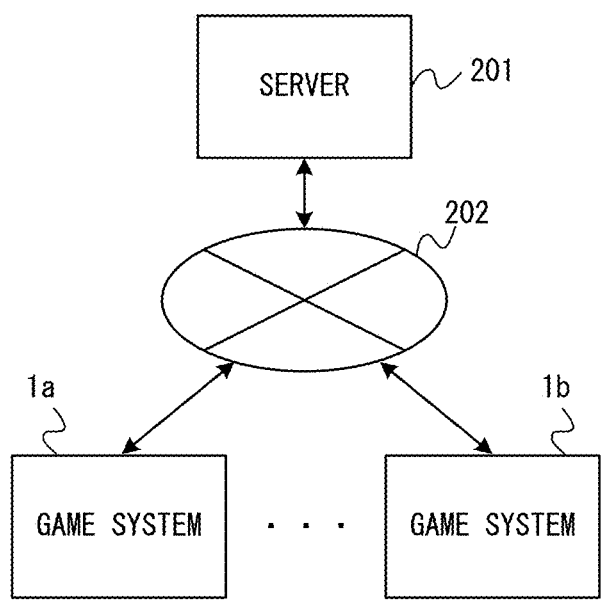
FIG. 8 is a block diagram showing an example of a configuration of a non-limiting information processing system including the game system shown in FIG. 1.

FIG. 8 is a block diagram showing an example of a configuration of an information processing system including the game system shown in FIG. 1. As shown in FIG. 8, the information processing system according to the exemplary embodiment includes a plurality of game systems (FIG. 8 shows game systems 1a and 1b) corresponding to the aforementioned game system 1 and used by different users. In the following description, any one game system among the plurality of game systems included in the information processing system may be referred to as a "game system 1". An information processing apparatus of a type different from the game system 1 may be included in the plurality of game systems included in the information processing system, and game processing described later (see FIGS. 10 and 11) may be executed between the game system 1 and the information processing apparatus.

As shown in FIG. 8, the information processing system includes a server 201 communicable with each game system. In the exemplary embodiment, the game systems 1 and the server 201 are connectable to a network 202 such as the Internet and/or a mobile communication network. Each game system 1 and the server 201 are communicable with each other via the network 202.

In this specification, the "server" indicates one information processing apparatus (i.e., a server apparatus). When the function of the server is implemented by a plurality of server apparatuses, the "server" indicates the entirety of a server apparatus group (i.e., a server system). That is, the "server" may be either a server apparatus or a server system. When a plurality of information processing apparatuses are included in a server system, these information processing apparatuses may be placed in the same place or different places. The hardware configuration of the server 201 of the exemplary embodiment may be the same as that for the conventional server.

Figure 9:
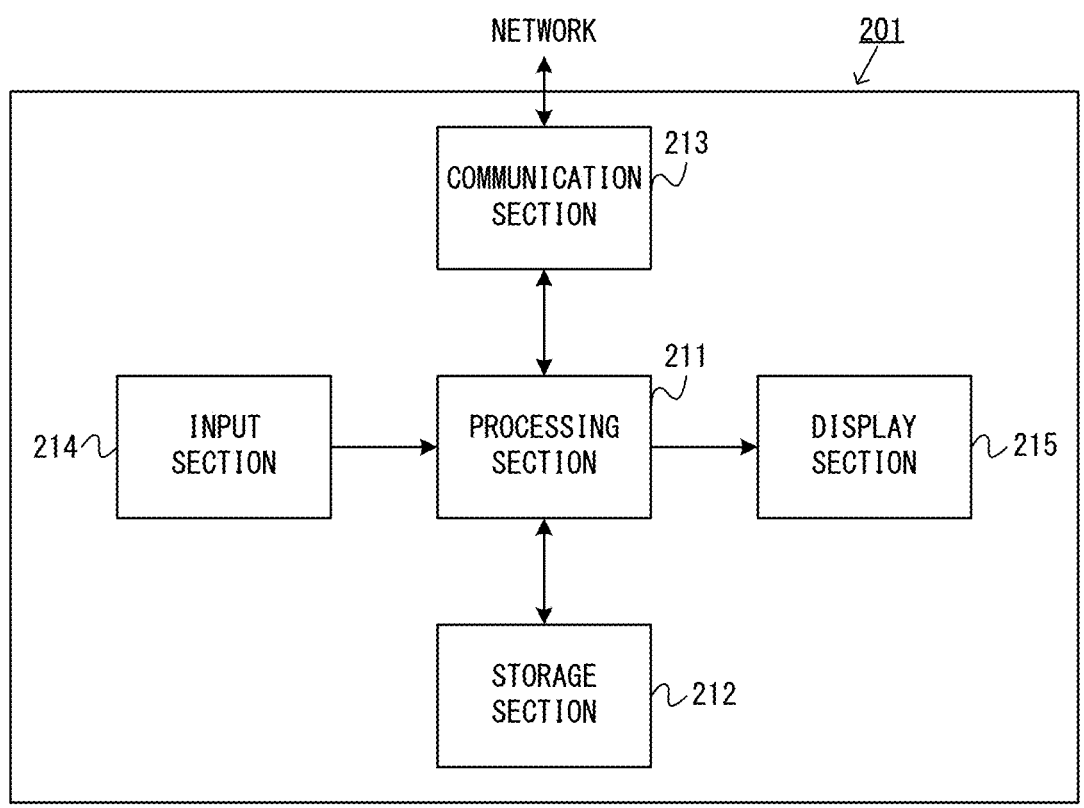
FIG. 9 is a block diagram showing an example of a configuration of a non-limiting server.

FIG. 9 is a block diagram showing an example of the configuration of the server 201. Each of components included in the server 201 shown in FIG. 9 is implemented by one or more information processing apparatuses. As shown in FIG. 9, the server 201 includes a processing section 211 and a storage section 212. The processing section 211 is electrically connected to the components 12 to 15 of the server 201. The processing section 211 includes a CPU (Central Processing Unit) and a memory. In the server 201, the CPU executes, using the memory, programs stored in the storage section 212, thereby executing various kinds of information processing. The storage section 212 is any storage device (also referred to as a storage medium) that is accessible to the processing section 211. The storage section 212 stores therein programs to be executed in the processing section 211, data to be used for information processing by the processing section 211, data obtained through the information processing, and the like. In the exemplary embodiment, the storage section 212 stores therein at least a program for game processing that is to be executed on the server side for game processing to be executed in the game system 1.

The server 201 includes a communication section 213. The communication section 213 is connected to the network 202, and has a function of communicating with another device (e.g., the game system 1) via the network 202. The processing section 211, by using the communication section 213, transmits information to the another device and receives information from the another device. The server 201 further includes an input section 214 and a display section 215 as input/output interfaces.

3. Outline of Processing in Information Processing System

Next, with reference to FIGS. 10 to 14, an outline of processing executed in the information processing system shown in FIG. 9 will be described. In the exemplary embodiment, the game system 1 executes a game in which a player character to be operated by a player (also referred to as a user) appears in a game space. The content of the game is discretionary. In the game, the player character moves on a game field in the game space, according to an operation performed by the player. In the exemplary embodiment, in a first game executed in a certain game system among the plurality of game systems described above, a player character of the first game may lose (or drop) an item. In this case, in a second game executed in another game system, a player character of the second game picks up the item, whereby the item is recovered (i.e., the item is returned to the player character of the first game). Hereinafter, this process will be described.

FIG. 10 shows an example of a flow of recovering an item lost in a game. In FIG. 10, an exemplary case where, among the plurality of game systems, a first game in which a player character A appears is executed in one game system (e.g., the game system 1a) while a second game in which a player character B appears is executed in another game system (e.g., the game system 1b), will be described.

In the exemplary embodiment, the first game and the second game are the same game or games of the same type in terms of game programs to be executed in the game system, and are performed by different players. It can also be said that the first game and the second game are games based on the same game program or game programs of the same type, and are different in game situation (e.g., the state of each character or the progress of game story). It can also be said the first game and the second game are games based on the same game program or game programs of the same type, and have different saved data. The "games of the same type" are, for example, two games based on different versions of a game program, two games which use the same game field and whose characters appearing in the game field and/or game stories are partially different from each other, and the like. In another embodiment, the first game and the second game may be different types of games.

In the exemplary embodiment, when a predetermined event occurrence condition has been satisfied during the game, a player character may be defeated in the field. For example, this event occurrence condition is that the health (that is, hit points) of a player character becomes 0 as a result of the player character having been attacked by an enemy character. In the example shown in FIG. 10, it is assumed that the player character A is defeated in the first game.

When the player character has been defeated as described above, the player character loses its own item (scene (a) in FIG. 10). Hereinafter, a game event in which the player character loses an item is referred to as a "loss event". A game image 221 shown in FIG. 10 is an example of a game image when a loss event has occurred. When the loss event has occurred, the game system 1 performs a display notifying that the player character has been defeated, and that the player character has dropped (i.e., lost) an item. In the exemplary embodiment, in terms of game setting, the player character is represented as if it drops the item in the game field due to the loss event. In actuality, however, the player character cannot pick up the item in the first game (even when the player character goes to the position where the loss event has occurred), but can pick up the item in the second game different from the first game. In another embodiment, however, even in the first game, the player character may be able to pick up the item dropped by itself when the player character goes to the position where the loss event has occurred.

In FIG. 10, information indicating that the loss event has occurred in the first game is transmitted from the game system 1a to the server 201, and is transmitted from the server 201 to another game system (here, the game system 1b in which the second game is executed). In the second game, the player character B can pick up an article (i.e., an item) that the player character A has lost, when the player character B goes to the position where the player character A has lost the item (i.e., where the loss event has occurred) in the first game (scene (b) in FIG. 10). Hereinafter, a game event in which a player character picks up an item that another player character has lost, is referred to as a "pick-up event". A game image 222 shown in FIG. 10 is an example of a game image when a pick-up event has occurred. When the pick-up event has occurred, the game system 1 performs a display notifying that a player character has picked up a lost item, and that the item has been sent to a player character (here, the player character A) who has lost the item.

In FIG. 10, information indicating that the pick-up event has occurred in the second game is transmitted from the game system 1b to the server 201, and is transmitted from the server 201 to the game system 1a where the first game is executed. Thus, in the first game, the item that has disappeared due to the loss event is recovered, that is, the item that has disappeared is returned to the player character A (scene (c) in FIG. 10). A game image 223 shown in FIG. 10 is an example of a game image when the lost item is recovered. When the lost item is recovered, the game system 1 performs a display notifying that the lost item has been returned, and a player character (here, the player character B) that has picked up the lost item.

As described above, in the exemplary embodiment, even when a player character has been defeated and a loss event has occurred in a game, if a pick-up event is caused by another player character in another game, the player character that has lost an item due to the loss event can recover the item. Moreover, a player character, when a loss event has been caused by another player character in another game, can help the another player character by performing a pick-up event. Thus, in the exemplary embodiment, it is possible to advance a game such that a player character asynchronously cooperates with another player character through a loss event and a pick-up event.

Figure 11:
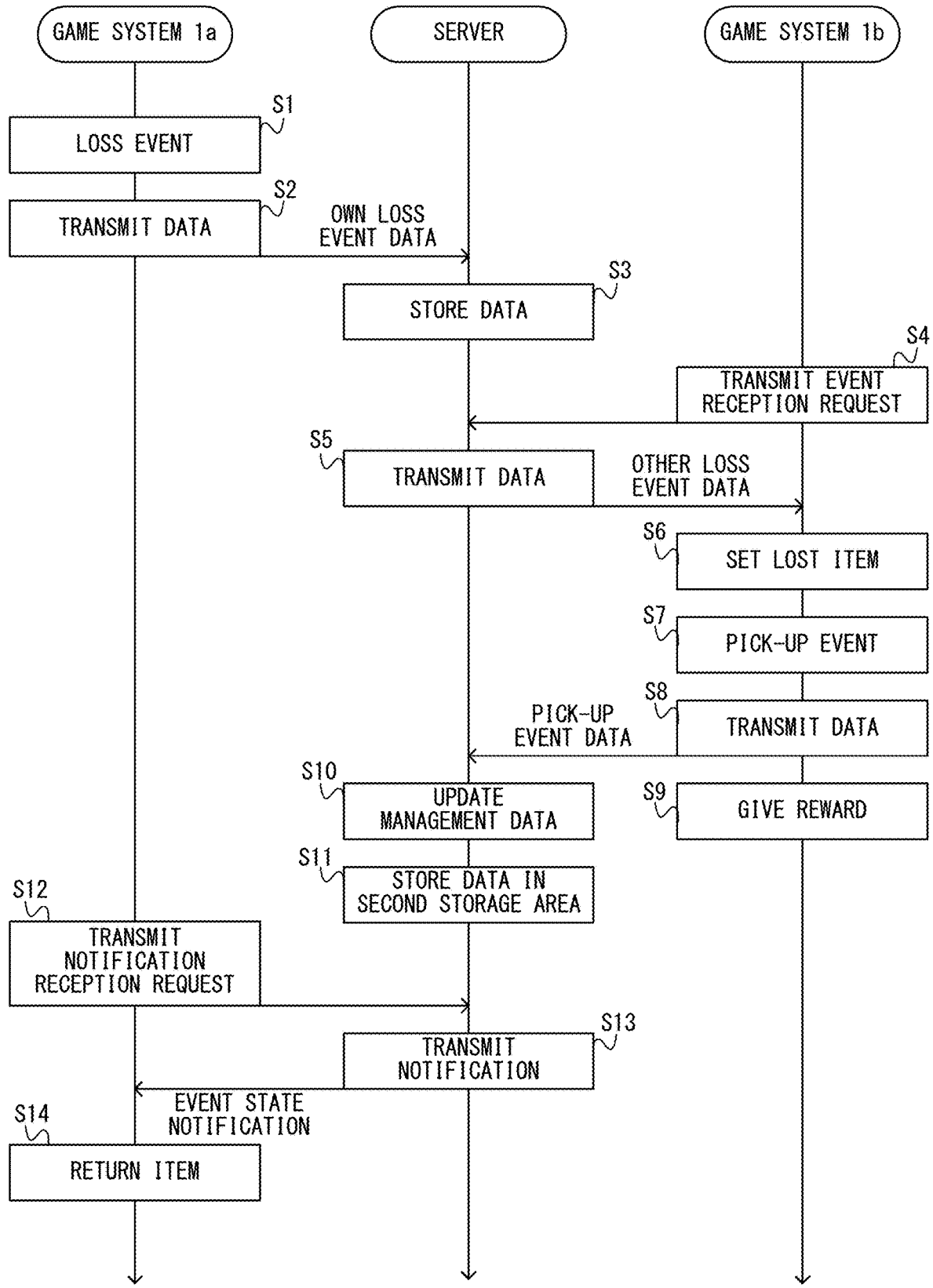
FIG. 11 shows an example of a process flow from when a loss event occurs to when an item is recovered.

FIG. 11 shows an example of a process flow from when a loss event occurs to when an item is recovered. In FIG. 11, it is assumed that a loss event occurs in a game performed in a game system 1a, and a pick-up event occurs in a game performed in a game system 1b.

In FIG. 11, firstly, when the event occurrence condition has been satisfied in the game system 1a, a loss event occurs (step S1). That is, the game system 1a causes items possessed by a player character to disappear. In the exemplary embodiment, the game system 1a causes some items, among all items possessed by the player character, to disappear based on a predetermined rule. The rule is discretionary. For example, the game system 1a may prevent an item used for advancing the story of the game or a valuable item (e.g., an item limited in number) from disappearing even when a loss event has occurred. The rule may be that some items selected at random from among all the items possessed by the player character are caused to disappear.

In the exemplary embodiment, when a loss event has occurred, the player character is returned to a predetermined position (e.g., the position of a base point) in the game field to restart the game. However, the method for restarting the game at occurrence of a loss event is discretionary. For example, in another embodiment, the game may be restarted from the position where the loss event has occurred.

Next, the game system 1a generates own loss event data indicating that a loss event has occurred in the game system 1a, and transmits the own loss event data to the server 201 (step S2). In the exemplary embodiment, the own loss event data includes position information, date/time information, representative item information, number-of-types information, and item owner information.

The position information indicates the position where the loss event has occurred (in other words, the position where the player character has lost an item) in the game field. The date/time information indicates date and time of occurrence of the loss event.

The representative item information indicates a representative item among items that have disappeared due to the loss event. The method for determining a representative item is discretionary. For example, a priority level may be set for each item type, and an item having the highest priority level, among the items that have disappeared due to the loss event, may be determined as the representative item. The number-of-types information indicates the number of types of items that have disappeared due to the loss event. Thus, in the exemplary embodiment, pieces of information indicating the outline of the items that have disappeared due to the loss event, such as the representative item information and the number-of-types information, are transmitted to the server 201 and another game system, while information indicating all the items having disappeared is not included in the own loss event data. Thus, reduction in data traffic between the game system and the server 201 can be achieved. Data indicating all the items having disappeared due to the loss event is stored in the game system 1a in which the loss event has occurred. For example, in the game system 1a, the data indicating the items is stored in association with information that can identify the loss event (e.g., information about the date and time and/or the position at which the loss event has occurred).

The item owner information indicates the player character that has lost the item due to the loss event (i.e., the player character that has owned the item). The item owner information may indicate the name of a user of the game system 1a in which the loss event has occurred.

In the exemplary embodiment, the game system 1a does not transmit the own loss event data immediately after occurrence of the loss event, but transmits the own loss event data when a predetermined transmission condition has been satisfied after occurrence of the loss event. Specifically, in the exemplary embodiment, the game system 1a transmits the own loss event data, on the condition that a predetermined waiting time has elapsed after occurrence of the loss event. The waiting time is determined according to a predetermined rule within a range from 30 minutes to 24 hours. The game system 1a transmits the own loss event data to the server 201 at a timing when the game system 1a becomes able to communicate with the server 201 during execution of the game after the waiting time has elapsed from occurrence of the loss event. If the own loss event data is transmitted immediately after the loss event, a pick-up event occurs immediately after occurrence of the loss event. As a result, there is a possibility that the item having disappeared is returned soon. In this case, meaning of the loss event becomes less significant, and there is a risk that amusement of the game is degraded. Meanwhile, in the exemplary embodiment, since the own loss event data is not transmitted until at least the waiting time elapses, the pick-up event is prevented from occurring immediately after the loss event.

The content of the transmission condition is discretionary, and is not limited to the condition regarding the time from occurrence of the loss event as in the exemplary embodiment. In another embodiment, for example, the transmission condition may be that the player character has performed a predetermined action in the game (e.g., claiming a lost item at a predetermined facility in the game). In another embodiment, the game system 1a may not necessarily set a transmission condition, and may transmit the own loss event data immediately after occurrence of the loss event. In this case, the server 201 may prevent the pick-up event from occurring in another game system (i.e., may not transmit other loss event data described later) until a waiting time elapses after reception of the own loss event data.

Upon receiving the own loss event data from the game system 1a, the server 201 generates event management data, based on the received own loss event data, and stores the generated data (step S3). The event management data is data indicating the content and the state regarding one loss event.

Figure 12:
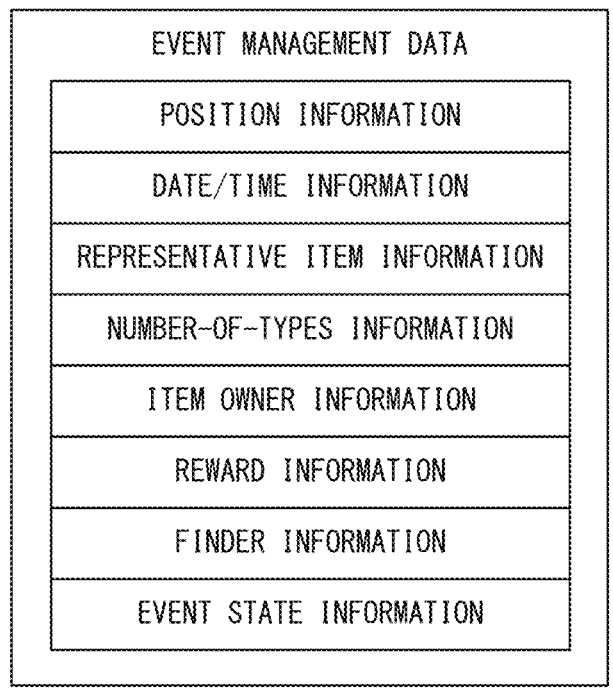
FIG. 12 shows an example of event management data.

FIG. 12 shows an example of the event management data. As shown in FIG. 12, the event management data includes position information, date/time information, representative item information, number-of-types information, item owner information, reward information, finder information, and event state information.

The contents of the position information, the date/time information, the representative item information, the number-of-types information, and the item owner information may be the same as those included in the own loss event data. The position information included in the event management data may indicate a position different from the position indicated by the position information included in the own loss event data, and may indicate a position determined based on the position information. For example, the server 201, based on the position indicated by the position information included in the own loss event data, may determine a position near the position, and may include position information indicating the determined position into the event management data. The date/time information included in the event management data may indicate the date and time when the own loss event data was transmitted (or received by the server 201).

The reward information indicates a reward to be given to a player character that has caused a pick-up event with respect to the loss event. The content of the reward may be determined in any way. For example, the server 201 may determine the content of the reward, based on the representative item information and/or the number-of-types information included in the own loss event data. In another embodiment, the content of the reward may be determined in the game system 1a in which the loss event has occurred, and information about the reward may be included in the own loss event data. Alternatively, the content of the reward may be determined in the game system 1b in which the pick-up event has occurred.

The finder information indicates the player character that has caused the pick-up event with respect to the loss event. Since the pick-up event has not yet occurred when the event management data is generated, the finder information is set to indicate that there is no finder. The finder information may indicate the name of the user of the game system 1b in which the pick-up event has occurred.

The event state information indicates whether the pick-up event with respect to the loss event has not yet occurred or has already occurred. Since the pick-up event has not yet occurred when the event management data is generated, the event state information is set to indicate that the pick-up event has not yet occurred.

Figure 13:
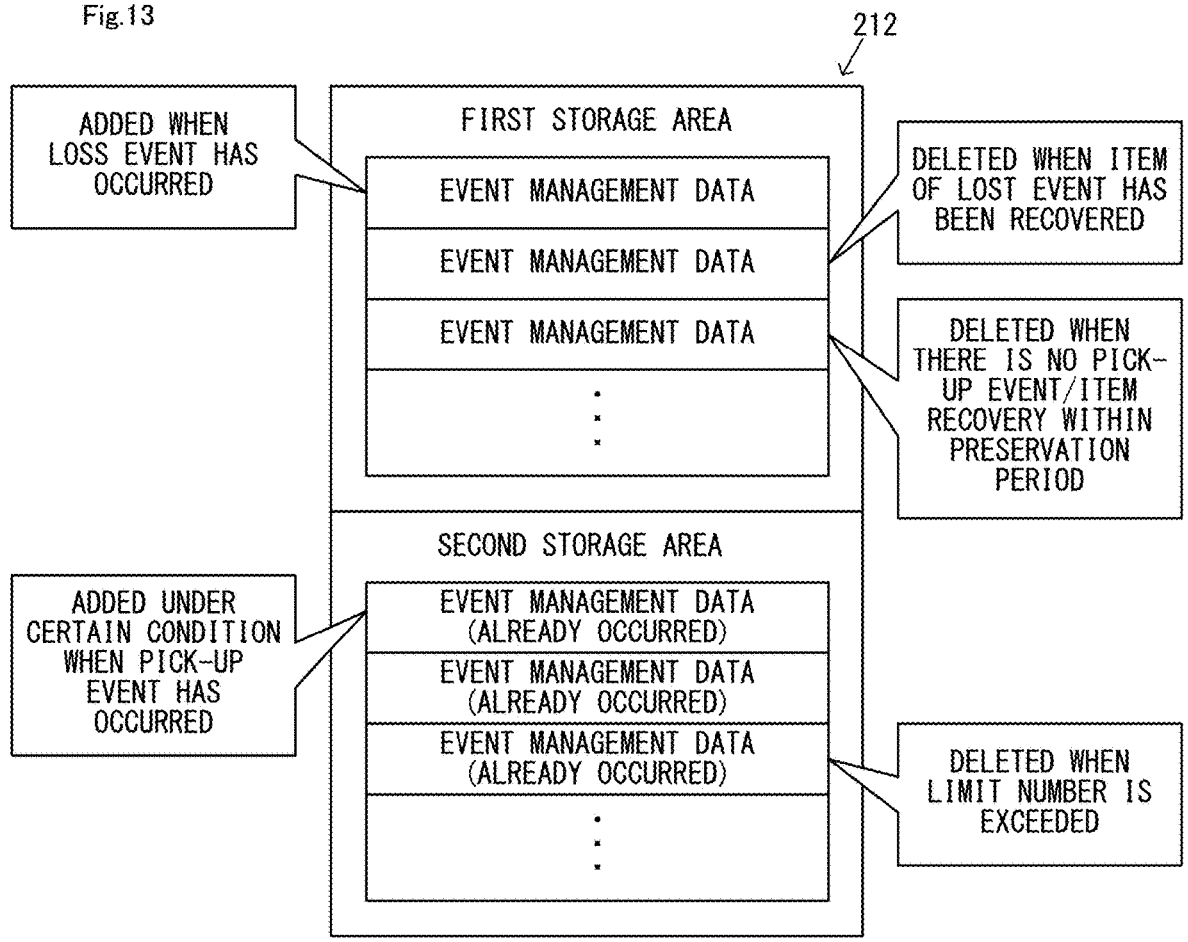
FIG. 13 shows an example of a storage area, in the non-limiting server, where event management data are stored.

In the exemplary embodiment, the server 201 stores, for each loss event, the event management data shown in FIG. 12. FIG. 13 shows an example of a storage area, in the server 201, where event management data are stored.

As shown in FIG. 13, in the exemplary embodiment, the storage section 212 of the server 201 includes a first storage area and a second storage area. In the server 201, the event management data are stored separately in the first storage area and the second storage area. The first storage area and the second storage area need not be physically separated storage areas as long as the event management data stored in the respective areas can be distinguished from each other.

In the exemplary embodiment, event management data of a loss event in the state where an item that has disappeared due to this loss event has not yet been recovered (i.e., the item has not yet been returned to the player character) is stored in the first storage area. That is, the event management data stored in the first storage area include: event management data regarding a loss event for which a pick-up event has not yet occurred; and event management data regarding a loss event for which a pick-up event has already occurred but an item has not yet been recovered. In the exemplary embodiment, when event management data has been generated in the server 201 (i.e., when a loss event has occurred in the game system), this event management data is firstly stored in the first storage area.

In the second storage area, event management data regarding a loss event for which a pick-up event has already occurred is stored. Although described later in detail, when a pick-up event has occurred with respect to event management data stored in the first storage area, the server 201 stores this event management data in the second storage area under a certain condition. How to use the first storage area and the second storage area of the exemplary embodiment will be described later in detail.

Referring back to FIG. 11, after the own loss event data has been stored in the server 201, the game system 1*b* transmits an event reception request to the server (step S4). The event reception request is a request for reception of data (referred to as "other loss event data") regarding a loss event that has occurred in a game of another game system. Upon receiving the other loss event data, the game system 1*b* becomes able to cause a pick-up event corresponding to the loss event that has occurred in the another game system. The condition and timing for transmitting an event reception request from a game system is discretionary. In the exemplary embodiment, the game system 1*b* transmits the event reception request to the server 201 in response to an instruction made by the player during the game.

Upon receiving the event reception request from the game system 1*b*, the server 201 generates other loss event data and transmits the generated data to the game system 1*b* (step S5). The other loss event data is data including the content of the loss event that has occurred in the game of the another game system. The server 201 generates the other loss event data, based on the event management data stored in the storage section 212. Specifically, in the exemplary embodiment, the other loss event data includes the aforementioned position information, reward information, representative item information, number-of-types information, item owner information, and event state information. The server 201 generates the other loss event data by extracting these pieces of information from the event management data.

In the exemplary embodiment, in step S5, the server 201 generates a plurality of pieces of other loss event data and transmits them to the game system 1*b*. That is, the server 201 generates pieces of other loss event data corresponding to a plurality of loss events, and transmits them to the game system 1*b*.

Figure 14:
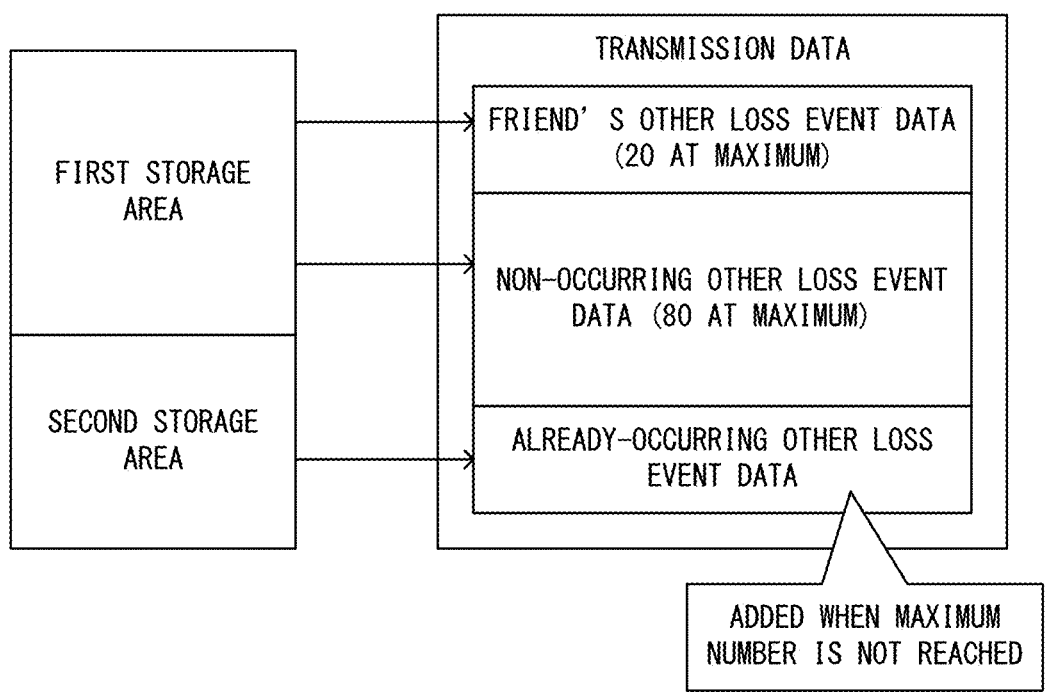
FIG. 14 shows an example of a method for generating other loss event data.

FIG. 14 shows an example of a method for generating other loss event data. In the exemplary embodiment, the server 201 generates data including a predetermined number (here, 80 to 100) of other loss event data, as transmission data to be transmitted to the game system 1*b* (see FIG. 14).

Specifically, the server 201 adds, in the transmission data, other loss event data (referred to as "friend's other loss event data") of loss events regarding players who are friends of the player of the game system 1*b* such that the number of the friend's other loss event data does not exceed a first upper limit number (here, 20) (see FIG. 14). In the exemplary embodiment, it is assumed that the server 201 stores therein information about players registered as friends of the player of each game system 1. The server 201 selects, from the event management data stored in the first storage area of the storage section 212, event management data (referred to as "friend's event management data") of the players who are friends of the player of the game system 1*b* such that the number of the friend's event management data does not exceed the first upper limit number, and generates other loss event data corresponding to the selected event management data. In the case where the number of friend's event management data included in the event management data stored in the first storage area is greater than the first upper limit number, the method for selecting friend's event management data is discretionary. In the case where the number of friend's event management data included in the event management data stored in the first storage area is less than the first upper limit number, the server 201 selects all the friend's event management data stored in the first storage area.

As described above, in the exemplary embodiment, when the server 201 has received, from the game system 1*b*, an event reception request that requests reception of other loss event data, then if event management data (i.e., friend's event management data) regarding players already registered as friends of the player of the game system 1*b* are stored in the first storage area, the server 201 transmits, to the game system 1*b*, at least one piece of other loss event data including the other loss event data based on the event management data. Therefore, when a loss event has occurred on a certain player, players who are friends of the certain player are provided with opportunities of performing pick-up events with respect to the loss event. Thus, motivation to perform pick-up events can be given to the friend players. Moreover, the certain player can play the game in corporation with the friend players.

The server 201 selects, from among the event management data stored in the first storage area of the storage section 212, event management data in which a pick-up event has not yet occurred (referred to as "non-occurring event management data") such that the number of the non-occurring event management data does not exceed a second upper limit number (here, 80), and generates other loss event data corresponding to the selected event management data. The method for selecting non-occurring event management data is discretionary. In the exemplary embodiment, the server 201 selects, at random, non-occurring event management data from among non-occurring event management data stored in the first storage area such that the number of the selected data does not exceed the second upper limit number. In the case where the number of non-occurring event management data included in the event management data stored in the first storage area is less than the second upper limit number, the server 201 selects all the non-occurring event management data stored in the first storage area.

As described above, in the exemplary embodiment, when the server 201 has received an event reception request from the game system 1*b*, the server 201 transmits, to the game system 1*b*, other loss event data based on at least one piece of event management data selected at random from among the non-occurring event management data stored in the first storage area. Therefore, the information processing system can ensure opportunities for occurrence of a pick-up event with respect to a loss event for which a pick-up event has not yet occurred, thereby ensuring opportunities for recovery of an item by the pick-up event.

In this specification, the phrase "selecting at random" means not only selecting each candidate (here, event management data) with equal probability, but also selecting a candidate such that the selection result has randomness (i.e., such that the selection results of a plurality of times of selection are not the same). For example, the server 201 may perform the selection such that the older the stored event management data is (i.e., the longer the time elapsed from storage of the event management data into the server 201 is), the more readily the event management data is selected.

The method for selecting non-occurring event management data is discretionary. The server 201 may select non-occurring event management data, based on a predetermined selection rule. For example, the selection rule may be a rule regarding the order in which the event management data were stored in the server 201, or a rule regarding the order in which the loss events occurred. Specifically, upon receiving an event reception request from the game system 1b, the server 201 may transmit, to the game system 1b, other loss event data based on at least one piece of event management data that has been selected, in chronological order of storage into the server 201 (or in chronological order of occurrence of the loss event), from among the non-occurring event management data stored in the first storage area. Thus, a pick-up event is more readily performed with respect to a loss even having a longer time from its occurrence.

Meanwhile, for example, the selection rule may be a rule regarding a position indicated by position information included in the event management data. Specifically, the server 201 may select a plurality of pieces of event management data such that the positions indicated by the position information included in the event management data are not biased in the game field. For example, when the game field is divided into a plurality of areas, the server 201 may select a plurality of pieces of event management data such that a predetermined number of event management data per area correspond to the positions in this area (i.e., such that the positions indicated by the position information in the event management data are included in this area).

In another embodiment, selection of non-occurring event management data may be performed by the game system 1b that transmits an event reception request. That is, the aforementioned "at least one piece of event management data selected at random from the non-occurring event management data stored in the first storage area" may be event management data selected by the game system 1b.

When a pick-up event has occurred with respect to event management data stored in the first storage area, the number of the non-occurring event management data stored in the first storage area decreases. In this case, there is a possibility that the server 201 cannot select non-occurring event management data as many as the second upper limit number (here, 80). In this case, the server 201 selects event management data, short of the second upper limit number, from the event management data stored in the second storage area, i.e., from event management data in which a pick-up event has already occurred (referred to as "already-occurring event management data"). Then, the server 201 generates other loss event data based on the selected event management data. Thus, the server 201 selects event management data such that the sum of the non-occurring event management data stored in the first storage area and the already-occurring event management data stored in the second storage area is equal to the second upper limit number. Thus, other loss event data as many as the second upper limit number are generated.

The method for selecting already-occurring event management data is discretionary, and may be the same as or different from the method for selecting non-occurring event management data.

As described above, in the exemplary embodiment, upon receiving an event reception request from the game system 1b, the server 201 transmits, to the game system 1b, at least a predetermined number (i.e., 80) of other loss event data. Thus, even when the number of non-occurring event management data stored in the server 201 is small, the server 201 can transmit a certain number of other loss event data to the game system 1b. Thus, in the game system 1b, the game is performed with a lot of other loss event data.

In the exemplary embodiment, the server 201 transmits, to the game system 1b, the other loss event data as many as the second upper limit number (here, 80) and the other loss event data, based on friend's event management data, as many as the first upper limit number (here, 20) at maximum. That is, when the server 201 has received the event reception request from the game system 1b, then if the event management data regarding players who have been registered as friends of the player of the game system 1b are stored in the first storage area, the server 201 transmits, to the game system 1b, the other loss event data regarding the players registered as friends by a first number (i.e., 20) at maximum, and the other loss event data regarding players different from the players registered as friends by a second number (i.e., 80). Thus, the server 201 can provide the player with opportunities of performing pick-up events with respect to loss events of the friend players. Moreover, even when the player has no friend player, the server 201 can transmit a certain number of other loss event data to the game system.

In another embodiment, the server 201 may generate not only the other loss event data based on the event management data regarding the loss event caused by the player, but also special other loss event data not regarding the loss event caused by the player (i.e., not based on the event management data). For example, during a specific period of time, the server 201 may generate other loss event data for which a special reward is given, without based on the event management data, and may transmit the generated data to the game system together with the other loss event data generated based on the event management data.

Upon receiving the transmission data including the plurality of pieces of other loss event data, the game system 1b, based on the plurality of pieces of other loss event data received, sets lost items in the game field of the game executed in the game system 1b (step S6). Thus, the game executed by the game system 1b enters the state where a pick-up event can be caused based on an operation performed by the player.

In the exemplary embodiment, the game system 1b selects, from among the plurality of pieces of other loss event data received, other loss event data as many as a predetermined placement number (e.g., 20), and sets lost items, based on the selected other loss event data. The game system 1b places, in the game field, one lost item for one piece of other loss event data. In the exemplary embodiment, the game system 1b sets the lost items at the positions indicated by the position information included in the other loss event data. In another embodiment, the positions where the lost items are set may not necessarily be the positions indicated by the position information included in the other loss event data, and may be positions determined based on the positions indicated by the position information (e.g., positions around the positions indicated by the position information), or may be positions determined independently from the positions indicated by the position information.

In the exemplary embodiment, the game system 1b selects the other loss event data as many as the placement number such that the lost items are uniformly placed in the game field. In the exemplary embodiment, it is assumed that the game field is divided into a plurality of (specifically, 5) areas. The game system 1b selects the other loss event data as many as the placement number such that 4 lost items are placed in each of the 5 areas. Thus, the game system 1b can set the lost items uniformly in the game field, which enables the player to easily cause a pick-up event.

In the exemplary embodiment, there is a possibility that, of the plurality of pieces of other loss event data received from the server 201, the number of other loss event data corresponding to (i.e., included in) a certain area is less than 4 (in another embodiment, selection of event management data on the server 201 side may be performed such that 4 or more other loss event data are included in each area, as described above). In this case, in the exemplary embodiment, the game system 1b newly generates additional other loss event data to be placed in the area, and sets a lost item based on the generated additional other loss event data. The additional other loss event data is not event data based on event management data regarding a loss event caused by another player, but is event data generated in the game system 1b, not based on event management data. The method for generating additional other loss event data is discretionary. For example, the game system 1b may generate the additional other loss event data by setting at random the content of each information, other than the position information, included in the other loss event data. In the game system 1b, the additional other loss event data is treated similarly to the other loss event data received from the server 201. For example, when a pick-up event has occurred with respect to a lost item based on the additional other loss event data, the game system 1b gives a reward to the player, based on reward information included in the other loss event data.

The method for selecting other loss event data to be used for setting of lost items from among the plurality of pieces of other loss event data received from the server 201 is discretionary. For example, in another embodiment, other loss event data designated by the player of the game system 1b from among the plurality of other loss event data received from the server 201 may be used for setting of lost items.

When the lost items have been set, the game system 1b may present, to the player, the outlines of the lost items during the game. For example, when a map image showing a map of the game field is displayed during the game, the game system 1b may display, together with the map image, marks indicating the positions where the lost items are set on the map. In addition, the game system 1b may display information related to the set lost items (specifically, item owner information, representative item information, and number-of-types information). For example, the game system 1b may display a list of the set lost items in a menu image displayed during the game, and may display the above information of a lost item selected from the list. This allows the player to confirm the contents of the set lost items. The above information can be specified by the representative item information, the number-of-types information, and the item owner information included in the other loss event data.

During the game in the game system 1b, a pick-up event occurs when the player character picks up a lost item (step S7). The game system 1b may determine that a lost item has been picked up when the player character has reached the position where the lost item is set, or when the player character, which is present at the position where the lost item is set, performs a predetermined action (e.g., an action of picking up the item).

When the pick-up event has occurred, the game system 1b transmits pick-up event data to the server 201 under a certain condition (step S8). The pick-up event data is data indicating that the pick-up event has occurred, and indicates any information that can specify event management data (in other words, other loss event data) corresponding to the pick-up event. For example, the pick-up event data includes position information, representative item information, and item owner information. In addition, the pick-up event data includes, as finder information, information indicating the player character that has caused the pick-up event.

In the exemplary embodiment, when the pick-up event that has occurred in step S7 is based on non-occurring other loss event data (i.e., other loss event data based on non-occurring event management data), the game system 1b transmits the pick-up event data to the server 201. Meanwhile, when the pick-up event that has occurred in step S7 is based on already-occurring other loss event data (i.e., other loss event data based on already-occurring event management data), the game system 1b does not transmit the pick-up event data to the server 201.

Whether the pick-up event that has occurred is based on the non-occurring other loss event data or the already-occurring other loss event data can be determined based on the event state information included in the other loss event data. When a pick-up event has occurred, then if the event state information in the other loss event data associated with the pick-up event indicates "not yet occurred", the game system 1b transmits the pick-up event data to the server 201. Thus, notification to the server 201 is not made with respect to the event management data in which a pick-up event has already occurred, whereby reduction in data traffic from the game system 1b to the server 201 can be achieved.

Moreover, when a pick-up event has occurred, the game system 1b gives a reward according to the pick-up event to the player. Specifically, the game system 1b gives, to the player, a reward indicated by the reward information included in the other loss event data regarding the pick-up event that has occurred (step S9). The content of the reward is discretionary. In the exemplary embodiment, the reward is a reward on the game, and more specifically, is an item to be used in the game (therefore, the reward may be regarded to be given to the player character). Thus, in the exemplary embodiment, the reward according to the pick-up event is determined based on the other loss event data that has already been received in the game system 1b. Therefore, when the game system 1b gives the reward, the game system 1b need not communicate with the server 201. In another embodiment, the content of the reward may be determined based on the representative item information and/or the number-of-types information instead of the reward information, or may be determined not based on the other loss event data (e.g., at random). For example, the game system 1b may determine the content of the reward depending on whether the pick-up event that has occurred is based on the non-occurring other loss event data or the already-occurring other loss event data.

In the exemplary embodiment, the game system 1b does not notify the player of the game system 1b of whether or not the pick-up event that has occurred was already performed by another player. This prevents the player from losing motivation to perform a pick-up event.

Meanwhile, upon receiving the pick-up event data from the game system 1b, the server 201 updates the event management data corresponding to the pick-up event data (step S10). Specifically, the server 201 updates the event management data corresponding to the received pick-up event data such that the event state information indicates "already occurred". In addition, the server 201 updates the event management data corresponding to the received pick-up event data such that the finder information has the content indicated by the finder information included in the pick-up event data. Moreover, the server 201 stores, in the event management data corresponding to the received pick-up event data, the date and time when the pick-up event has occurred or date and time when the pick-up event data has been received.

In the exemplary embodiment, it is conceivable that, in a period from when other loss event data is transmitted to a certain game system to when a pick-up event occurs in this game system, the same other loss event data may be transmitted to another game system and a pick-up event occurs in this another game system. In this case, pick-up event data may be transmitted, from the certain game system, with respect to the event management data in which the event state information indicates "already occurred". In this case, the server 201 does not update the event management data. That is, in the exemplary embodiment, as for one piece of event management data, the server 201 updates this data upon firstly receiving pick-up event data, and thereafter, does not update the data. Thus, the server 201 manages a player character (i.e., first finder) that has firstly caused a pick-up event with respect to one loss event, based on the finder information included in the event management data.

As described above, in the exemplary embodiment, event management data includes information (i.e., finder information) regarding a player who has caused a pick-up event. Then, the server 201 stores information regarding a player of a game system that has firstly transmitted pick-up event data to the server 201, i.e., a player of a game system that has transmitted the pick-up event data firstly received by the server 201, as the information regarding the player who has caused the pick-up event. Therefore, in the exemplary embodiment, the server 201 can allow a plurality of players to perform a pick-up event with respect to one loss event, and can store therein information regarding the player who has firstly performed the pick-up event with respect to the loss event.

The "information regarding a player" includes any information that can identify the player. The "information regarding a player" includes not only the name of a player character but also the name or ID of the player himself/herself.

The server 201 stores event management data corresponding to the received pick-up event data among the event management data stored in the first storage area, into the second storage area under a certain condition (step S11). That is, the server 201 stores, in the second storage area, the event management data in which the pick-up event has occurred, according to the occurrence of the pick-up event (see FIG. 13).

In the exemplary embodiment, the server 201 determines at random, based on a predetermined probability, whether or not to store the event management data into the second storage area according to the pick-up event. Thus, the frequency of the process of storing the event management data into the second storage area can be reduced, thereby reducing the processing load. Moreover, in the exemplary embodiment, since the above determination is performed at random, it is possible to reduce the risk that the contents of the event management data stored in the second storage area are biased. The above determination may be performed in any method. For example, in another embodiment, the server 201 may store, in the second storage area, event management data that satisfies a predetermined condition, or may store, in the second storage area, all event management data corresponding to the received pick-up event data.

Meanwhile, in the game system 1a in which the loss event has occurred, a notification reception request is transmitted to the server 201 at a predetermined timing (step S12). The notification reception request is a request for reception of an event state notification regarding the state regarding the loss event that has occurred in the game system 1a (i.e., whether a pick-up event corresponding to the loss event has not yet occurred or has already occurred). The predetermined timing at which the notification reception request is transmitted is discretionary. In the exemplary embodiment, for example, the game system 1a transmits the notification reception request to the server 201 at a timing when the game system 1a communicates with the server 201 or at a timing when an instruction is made by the player during the game.

Upon receiving the notification reception request from the game system 1a, the server 201 generates an event state notification and transmits the notification to the game system 1a (step S13). The event state notification includes information indicating the state regarding the loss event that has occurred in the game system having transmitted the notification reception request. Specifically, the event state notification includes information indicating whether or not a pick-up event corresponding to the loss event that occurred in the game system 1a has newly occurred. For example, if event management data, which is related to the game system 1a and is already-occurring event management data, is stored in the first storage area, the server 201 transmits the event state notification indicating that a pick-up event has newly occurred. In this case, the event state notification includes the finder information regarding the pick-up event. Meanwhile, if event management data, which is related to the game system 1a and is already-occurring event management data, is not stored in the first storage area, the server 201 transmits the event state notification indicating that a new pick-up event has not occurred.

By receiving the above event state notification, the game system 1a can confirm whether or not a pick-up event corresponding to the loss event that occurred in the game system 1a has newly occurred (i.e., whether or not the lost item has been picked up by another player character). When a pick-up event corresponding to the loss event has newly occurred, the game system 1a restores the item that has disappeared due to the loss event (step S14). As described above, since the game system 1a stores therein the data indicating the item that has disappeared due to the loss event, the game system 1a, based on the data, can restore the item that has disappeared to the item possessed by the player character. Thus, the item that has disappeared due to the loss event is recovered.

In step S13, when the server 201 has transmitted, to the game system 1a, the event state notification indicating that the pick-up event has already occurred, the server 201 deletes the event management data regarding the pick-up event from the first storage area. That is, the server 201 deletes the event management data regarding the loss event from the first storage area, in response to that the item that has disappeared due to the loss event is recovered (see FIG. 13). Thus, in the exemplary embodiment, the server 201 transmits, to the game system 1a, a notification notifying that the pick-up event corresponding to the loss event data transmitted by the game system 1a has already occurred, and thereafter, deletes the event management data regarding the loss event data from the first storage area. Thus, the amount of the event management data stored in the first storage area can be reduced.

The server 201 deletes the event management data stored in the first storage area when a predetermined period has elapsed. Specifically, if a pick-up event corresponding to a loss event is not performed in a period from when the loss event occurs to when a predetermined first preservation period elapses, the server 201 deletes the event management data regarding the loss event from the first storage area (see FIG. 13). The server 201 can know when the loss event has occurred, based on the date/time information included in the event management data, and can know that a pick-up event has occurred, based on the pick-up event data received from the game system 1b. If an item corresponding to a pick-up event is not recovered in a period from when the pick-up event occurs regarding event management data to when a predetermined second preservation period elapses (i.e., if the server 201 does not receive a notification reception request regarding the event management data from the game system 1a), the server 201 deletes the event management data from the first storage area (see FIG. 13). As described above, if a pick-up event or recovery of an item, regarding event management data, is not performed in a predetermined period as described above, the server 201 deletes the event management data from the first storage area. Thus, the amount of the event management data stored in the first storage area can be reduced.

In the exemplary embodiment, the second preservation period is set to be longer than the first preservation period. As described above, in the exemplary embodiment, other loss event data regarding one loss event that has occurred in a certain game system can be transmitted to a plurality of other game systems, thereby providing many opportunities of a pick-up event corresponding to the loss event. Therefore, in the exemplary embodiment, the first preservation period can be made to be relatively short. Since the second preservation period is relatively long, it is possible to reduce the risk that an item, which can be recovered because of a pick-up event having occurred, is not recovered because a notification reception request is not made within the second preservation period.

If the number of the event management data stored in the second storage area exceeds a predetermined limit number (here, 10000), the server 201 deletes the surplus event management data (see FIG. 13). Specifically, in the above case, the server 201 deletes the event management data exceeding the limit number, starting from the oldest one, among the event management data stored in the second storage area. Thus, the server 201 can ensure a predetermined amount of event management data, and reduce the amount of the event management data stored in the second storage area.

In the exemplary embodiment, since the event management data are managed separately in the first storage area and the second storage area, selection and deletion of the event management data are facilitated. For example, when the server 201 generates transmission data including a plurality of pieces of other loss event data, the server 201 may select non-occurring event management data not from the second storage area but from the first storage area and may select already-occurring event management data not from the first storage area but from the second storage area. In addition, for example, as for event management data to be deleted because the first or second preservation period has elapsed, the server 201 may specify the event management data not from the second storage area but from the first storage area. In another embodiment, the server 201 may manage the event management data without separating them into the first storage area and the second storage area.

4. Specific Example of Processing in Information Processing System

Next, with reference to FIGS. 15 to 18, a specific example of information processing in the information processing system will be described.

[4-1. Data Used for Information Processing]

Figure 15:
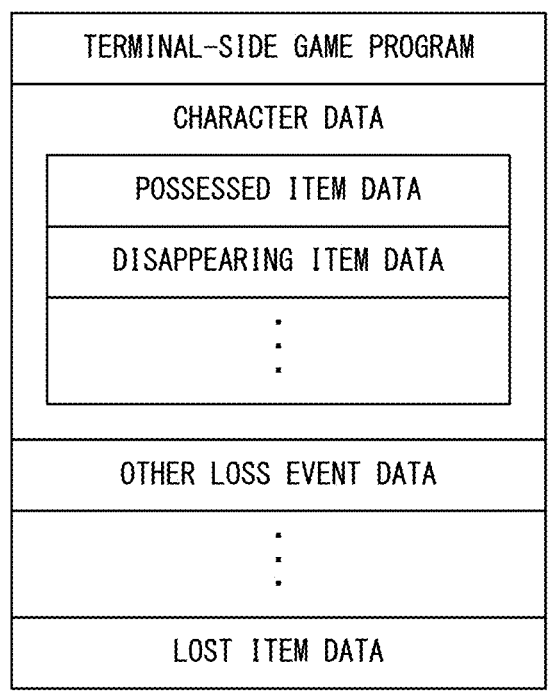
FIG. 15 shows an example of various types of data used for information processing in the non-limiting game system.

FIG. 15 shows an example of various types of data used for the information processing in the game system. The various types of data shown in FIG. 15 are stored in a storage medium (e.g., the flash memory 84, the DRAM 85, and/or the memory card attached to the slot 23) accessible by the main body apparatus 2 of the game system 1.

As shown in FIG. 15, the game system 1 stores therein a terminal-side game program. The terminal-side game program is a game program on the terminal side for executing the game, and is a program for game processing (processes shown in FIGS. 16 and 17) to be executed in the game system 1. That is, the processor 81 of the game system 1 executes the terminal-side game program, whereby processes described later (see FIGS. 16 and 17) are executed in the game system 1.

The game system 1 stores therein at least character data, other loss event data, and lost item data. In addition to these data, the game system 1 stores therein various types of data used for executing the game.

The character data indicates various types of information regarding the player character of the game in the game system 1. The character data includes possessed item data and disappearing item data. The possessed item data indicates items possessed by the player character. The disappearing item data indicates an item having disappeared due to the loss event from the items possessed by the player character. The character data further includes information indicating the name of the player character.

The other loss event data is received from the server 201 as described above. As described above, the game system 1 receives a plurality of pieces of other loss event data from the server 201, and stores the other loss event data therein. The lost item data indicates the positions of lost items that are set based on the other loss event data.

As shown in FIG. 13, the server 201 stores therein event management data. The server 201 further stores therein a server-side game program (not shown). The server-side game program is a game program on the server side for executing the game, and is a program for server processing (processes shown in FIG. 18) to be executed in the server 201. That is, the processing section 211 of the server 201 executes the server-side game program, whereby processes described later (see FIG. 18) are executed in the server 201.

In addition to the data shown in FIG. 13, the server 201 may store therein a part or the entirety of the various types of data (see FIG. 15) stored in the game system 1, for use in executing the server processing. Each of the data to be used in the information processing system may be stored in either the server 201 or the game system 1. When the same data is stored in the server 201 and the game system 1, synchronization between the data stored in the server 201 and the data stored in the game system 1 is made at an appropriate timing.

[4-2. Processing in Game System 1]

Figure 16:
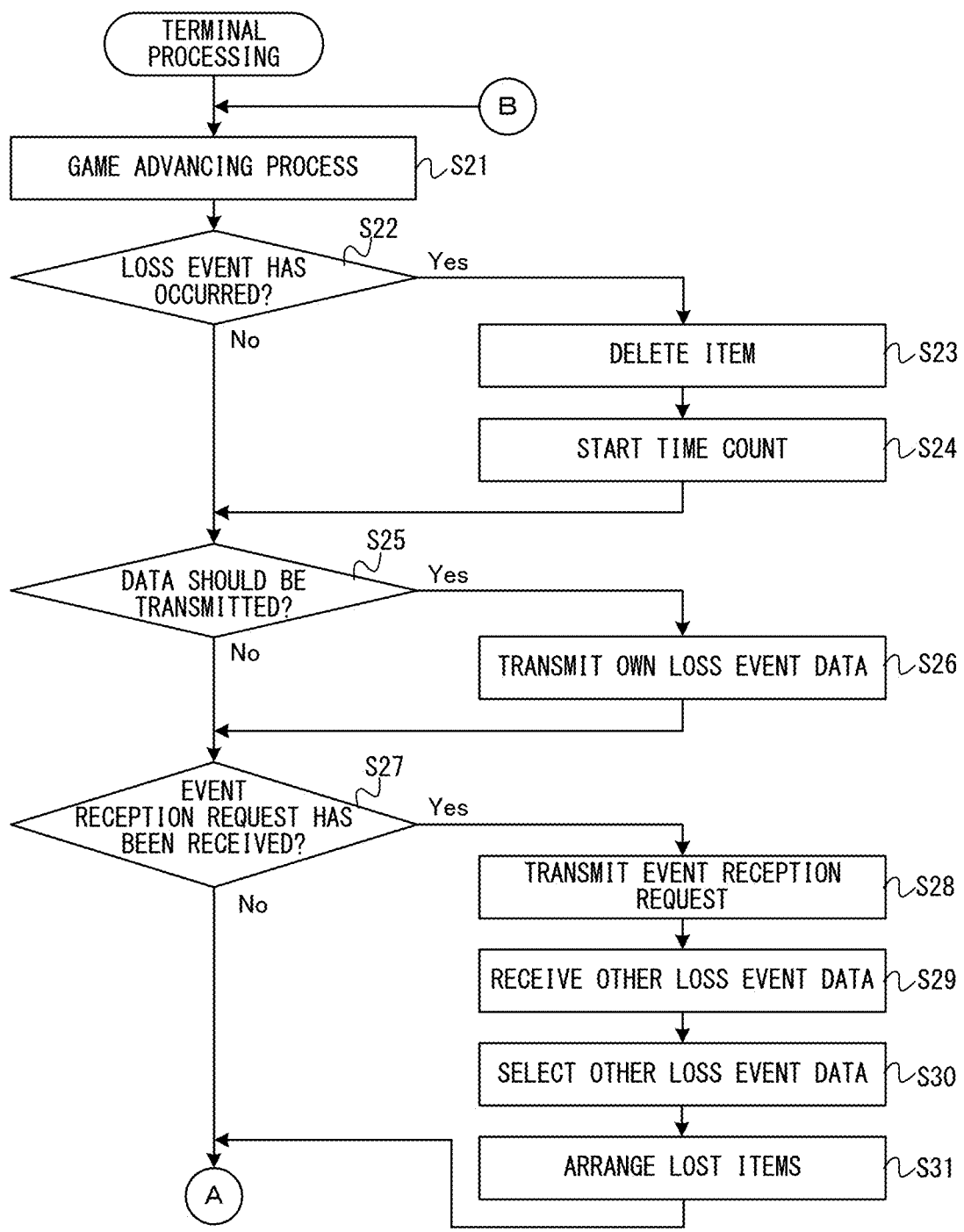
FIG. 16 is a flowchart showing an example of a flow of termination processing which is game processing executed by the non-limiting game system.
Figure 17:
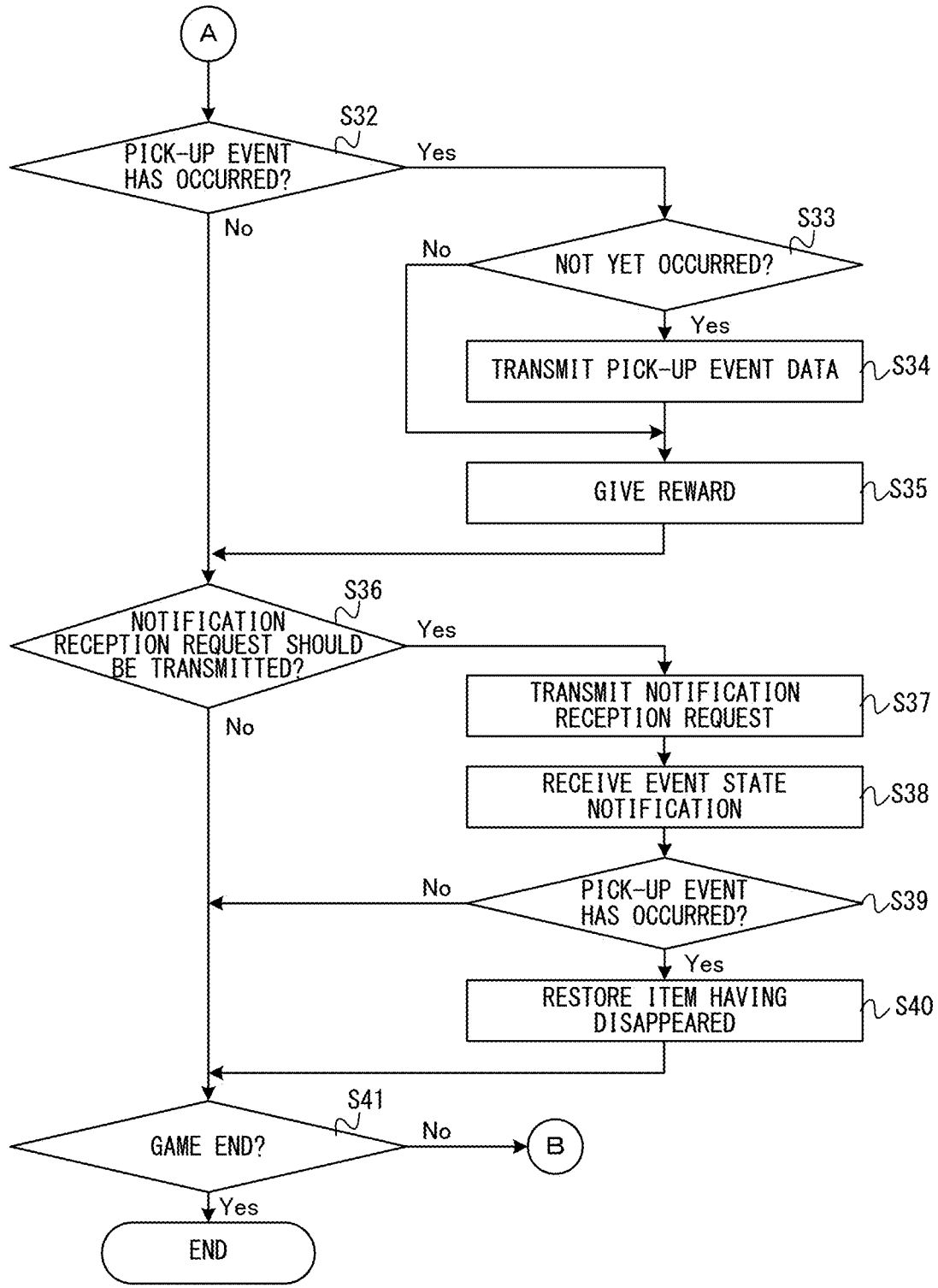
FIG. 17 is a flowchart showing an example of a flow of terminal processing which is game processing executed by the non-limiting game system.

FIGS. 16 and 17 are flowcharts showing an example of a flow of terminal processing which is game processing executed by the game system 1. The terminal processing shown in FIGS. 16 and 17 is started when an instruction to start the game has been made by the player during execution of the terminal-side game program.

In the exemplary embodiment, the processor 81 of the main body apparatus 2 executes the terminal-side game program stored in the game system 1 to execute processes in steps shown in FIGS. 16 and 17. The processor (i.e., the processing section 211) of the server 201 executes the server-side game program stored in the server 201 to execute processes in steps shown in FIG. 18. However, in another embodiment, a part of the processes in the steps may be executed by a processor (e.g., a dedicated circuit or the like) other than the above processor. A part of the processes in the steps to be executed in the game system 1 may be executed in the server 201, and a part of the processes in the steps to be executed in the server 201 may be executed in the game system 1. The processes in the steps shown in FIGS. 16 to 18 are merely an example, and the processing order of the steps may be changed or another process may be executed in addition to (or instead of) the processes in the steps as long as similar results can be obtained.

Figure 18:
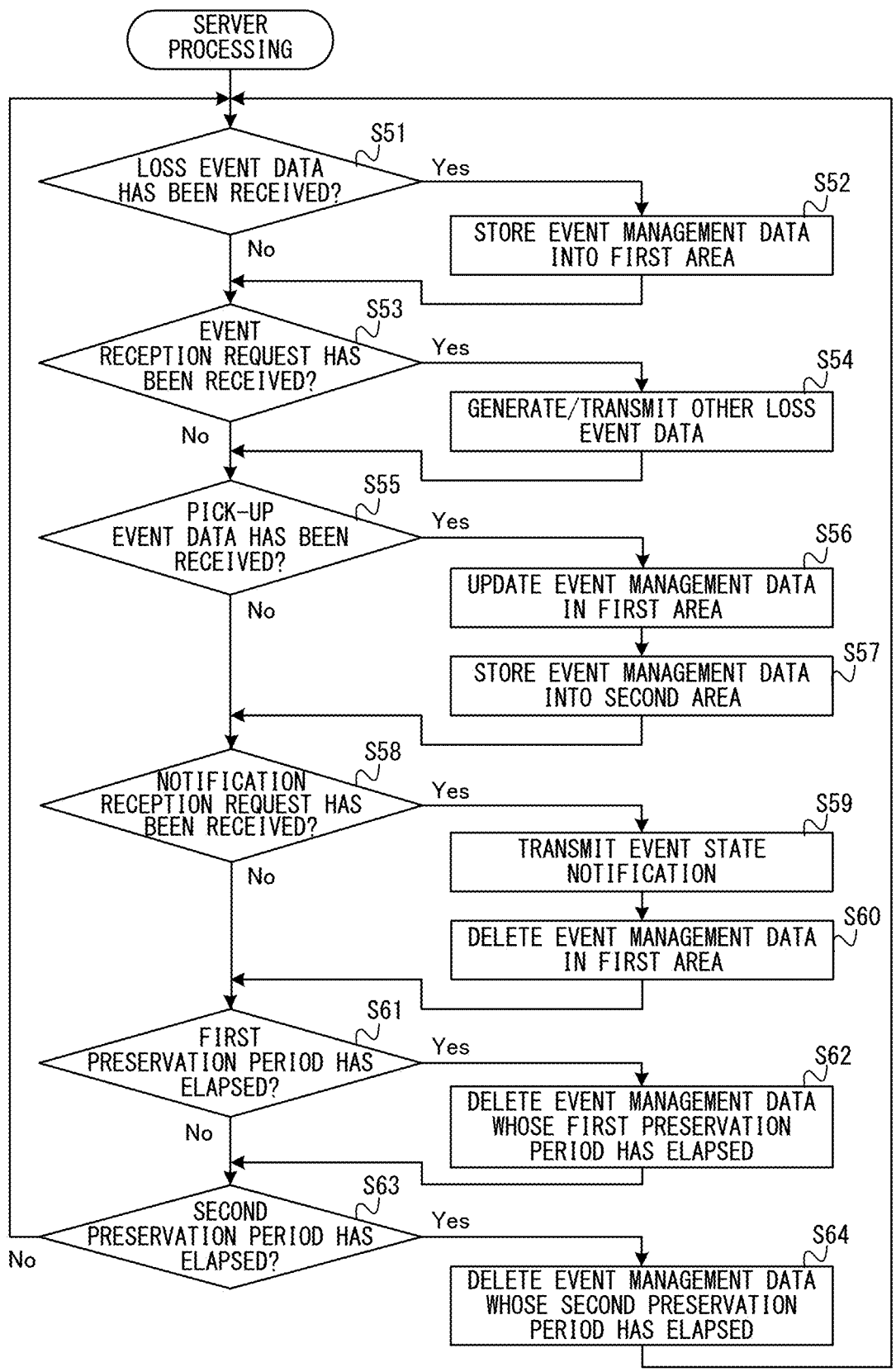
FIG. 18 is a flowchart showing an example of a flow of server processing executed by the non-limiting server.

The processor of the game system 1 or the server 201 executes the processes in the steps shown in FIGS. 16 to 18 by using a memory (e.g., the DRAM 85). That is, the processor stores information (in other words, data) obtained in each process step into the memory, and reads out the information from the memory when using the information for the subsequent process steps.

In step S21 shown in FIG. 16, the processor 81 executes a process for advancing the game. For example, the processor 81 controls the motion of the player character, according to an input performed by the player, controls the motions of characters other than the player character, according to an algorithm determined in the game program, generates a game image, and displays the game image on the display 12. In the exemplary embodiment, the game system 1 displays the image on the display 12. However, the game system 1 may display the image on another display device (e.g., a monitor connected to the main body apparatus 2) different from the display 12. The process in step S21 is repeatedly executed once every predetermined time period (e.g., one-frame time). Next to step S21, the process in step S22 is executed.

In step S22, the processor 81 determines whether or not a loss event has occurred in the game. That is, the processor 81 determines whether or not the event occurrence condition has been satisfied as the result of the process in step S21. When the determination result in step S22 is positive, the process in step S23 is executed. When the determination result in step S22 is negative, the processes in steps S23 and S24 are skipped and the process in step S25 described later is executed.

In step S23, the processor 81 causes an item possessed by the player character to disappear (see step S1 in FIG. 11). Specifically, the processor 81 selects an item to disappear from among the items possessed by the player character, and updates the possessed item data stored in the memory so that the content of the updated data does not include the selected item. Thus, the player character has lost the item. The processor 81 newly stores disappearing item data indicating the selected item into the memory. Next to step S23, the process in step S24 is executed.

In step S24, the processor 81 starts counting elapsed time from when the loss event occurred. Next to step S24, the process in step S25 is executed.

In step S25, the processor 81 determines whether or not to transmit the aforementioned own loss event data. Specifically, the processor 81 determines whether or not the time, being counted starting from step S24, has exceeded the aforementioned waiting time and whether or not the game system 1 is communicable with the server 201. When the determination result in step S25 is positive, the process in step S26 is executed. When the determination result in step S25 is negative, the process in step S26 is skipped and the process in step S27 described later is executed.

In step S26, the processor 81 transmits own loss event data to the server 201 (see step S2 in FIG. 11). Specifically, the processor 81 generates the own loss event data with respect to the loss event determined in step S22 as having occurred, and transmits the generated own loss event data to the server 201 through the network communication section 82. Next to step S26, the process in step S27 is executed.

In step S27, the processor 81 determines whether or not to transmit the aforementioned event reception request. In the exemplary embodiment, the processor 81 determines whether or not an instruction to transmit the event reception request has been made by the player. When the determination result in step S27 is positive, the process in step S28 is executed. When the determination result in step S27 is negative, the processes in steps S28 to S31 are skipped and the process in step S32 (see FIG. 17) described later is executed.

In step S28, the processor 81 transmits an event reception request to the server 201 (see step S4 in FIG. 11). Specifically, the processor 81 generates data of the event reception request, and transmits the generated data to the server 201 through the network communication section 82. Next to step S28, the process in step S29 is executed.

In step S29, the processor 81 receives other loss event data transmitted from the server 201. Here, the server 201, which has received the event reception request transmitted from the game system 1 through the process in step S28, transmits, to the game system 1, transmission data including a plurality of pieces of other loss event data. The processor 81 receives the transmission data through the network communication section 82. The plurality of pieces of other loss event data included in the received transmission data are stored in the memory. Next to step S29, the process in step S30 is executed.

In step S30, the processor 81 selects other loss event data to be used for setting lost items in the game, from among the plurality of pieces of other loss event data received in step S29. That is, the processor 81 selects, from among the plurality of pieces of other loss event data stored in the memory, other loss event data as many as the aforementioned placement number, according to the method described in the above "[3. Outline of processing in information processing system]". Next to step S30, the process in step S31 is executed.

In step S31, the processor 81 sets lost items in the game field, based on the other loss event data selected in step S30 (see step S6 in FIG. 11). A specific process for setting the lost items may be a process of placing objects representing the lost items in the game field, or may be a process of simply setting the positions of the lost items on the map of the game field (without placing the objects representing the lost items in the game field). Next to step S31, the process in step S32 is executed.

In step S32 shown in FIG. 17, the processor 81 determines whether or not a pick-up event has occurred in the game. That is, the processor 81 determines whether or not the lost item set in step S31 has been picked up by a player character. When the determination result in step S32 is positive, the process in step S33 is executed. When the determination result in step S32 is negative, the processes in steps S33 to S35 are skipped and the process in step S36 described later is executed.

In step S33, the processor 81 determines whether or not the pick-up event determined in step S32 as having occurred is based on non-occurring other loss event data. The processor 81 performs this determination, based on the event state information included in the other loss event data regarding the pick-up event. When the determination result in step S33 is positive, the process in step S34 is executed.

When the determination result in step S33 is negative, the process in step S34 is skipped and the process in step S35 described later is executed.

In step S34, the processor 81 transmits pick-up event data to the server 201 (see step S8 in FIG. 11). Specifically, the processor 81 generates pick-up event data regarding the pick-up event determined in step S32 as having occurred, and transmits the generated pick-up event data to the server 201 through the network communication section 82. Next to step S34, the process in step S35 is executed.

In step S35, the processor 81 gives a reward according to the pick-up event to the player (see step S9 in FIG. 11). That is, the processor 81 gives an item as the reward to the player character. In this case, the processor 81 updates the content of the possessed item data stored in the memory so that the updated content includes the given item. Next to step S35, the process in step S36 is executed.

In step S36, the processor 81 determines whether or not to transmit the aforementioned notification reception request. In the exemplary embodiment, the processor 81 determines to transmit the notification reception request, when a timing for the game system 1 to communicate with the server 201 has come, or when an instruction to transmit the notification reception request has been made by the player. The processor 81 determines not to transmit the notification reception request, when the timing for the game system 1 to communicate with the server 201 has not yet come and an instruction to transmit the notification reception request has not been made by the player. When the determination result in step S36 is positive, the process in step S37 is executed. When the determination result in step S36 is negative, the processes in steps S37 to S40 are skipped and the process in step S41 described later is executed.

In step S37, the processor 81 transmits a notification reception request to the server 201 (see step S12 in FIG. 11). Specifically, the processor 81 generates data of the notification reception request, and transmits the generated data to the server 201 through the network communication section 82. Next to step S37, the process in step S38 is executed.

In step S38, the processor 81 receives an event state notification transmitted from the server 201. The server 201, which has received the notification reception request transmitted from the game system 1 through the process in step S37, transmits the event state notification regarding the game system 1 to the game system 1. The processor 81 receives the event state notification through the network communication section 82. Next to step S38, the process in step S39 is executed.

In step S39, the processor 81, based on the event state notification received in step S38, determines whether or not a pick-up event corresponding to a loss event having occurred in the game system 1 has newly become "already occurred". When the determination result in step S39 is positive, the process in step S40 is executed. When the determination result in step S39 is negative, the process in step S40 is skipped and the process in step S41 is executed.

In step S40, the processor 81 restores the item that has disappeared due to the loss event for which the pick-up event has occurred (see step S14 in FIG. 11). That is, the processor 81 restores the item having disappeared to the item possessed by the player character. Specifically, the processor 81 updates the content of the possessed item data stored in the memory so that the updated content includes the item indicated by the disappearing item data corresponding to the loss event. Thus, the item that has disappeared due to the loss event is recovered. Next to step S40, the process in step S41 is executed.

In step S41, the processor 81 determines whether or not to end the game. For example, the processor 81 determines whether or not an instruction to end the game has been made by the user. When the determination result in step S41 is negative, the process in step S21 is executed again. Thereafter, a series of processes in steps S21 to S41 is repeatedly executed until it is determined in step S41 to end the game. When the determination result in step S41 is positive, the processor 81 ends the terminal processing shown in FIGS. 16 and 17.

In the above terminal processing according to the exemplary embodiment, the game system 1 executes both the processes related to the loss event (steps S22 to S26 and steps S36 to S40) and the processes related to the pick-up event (steps S27 to S35). That is, in the exemplary embodiment, during one game, a loss event may occur, and a pick-up event, which corresponds to a loss event having occurred in another game, may also occur. Therefore, the player can be helped by another player who performs a pick-up event corresponding to a loss event of the player, and can help another player by performing a pick-up event corresponding to a loss event of the another player. Therefore, these players can advance the game while cooperating with each other.

In another embodiment, only a loss event may occur in one game while only a pick-up event may occur in the other game. That is, the game system 1 that executes the one game may execute the process related to a loss event without executing the process related to a pick-up event, while the game system 1 that executes the other game may execute the process related to a pick-up event without executing the process related to a loss event.

[4-3. Processing in Server 201]

FIG. 18 is a flowchart showing an example of a flow of server processing executed by the server. A series of processes shown in FIG. 18 is continuously executed while the server 201 is operated.

In step S51, the processing section 211 determines whether or not loss event data has been received from the game system 1 through the communication section 213. When the determination result in step S51 is positive, the process in step S52 is executed. When the determination result in step S51 is negative, the process in step S52 is skipped and the process in step S53 described later is executed.

In step S52, the processing section 211 generates event management data, based on the received loss event data, and stores the generated data in the first storage area of the storage section 212 (see step S3 in FIG. 11). Next to step S52, the process in step S53 is executed.

In step S53, the processing section 211 determines whether or not an event reception request has been received from the game system 1 through the communication section 213. When the determination result in step S53 is positive, the process in step S54 is executed. When the determination result in step S53 is negative, the process in step S54 is skipped and the process in step S55 described later is executed.

In step S54, the processing section 211 generates transmission data including a plurality of pieces of other loss event data, and transmits the transmission data to the game system 1 having transmitted the event reception request (see step S5 in FIG. 11). That is, the processing section 211 generates the transmission data including the plurality of pieces of other loss event data, based on the event management data stored in the first storage area, according to the method described in the above "[3. Outline of processing in information processing system]". Then, the processing section 211 transmits the generated transmission data to the game system 1 through the communication section 213. Next to step S54, the process in step S55 is executed.

In step S55, the processing section 211 determines whether or not pick-up event data has been received from the game system 1 through the communication section 213. When the determination result in step S55 is positive, the process in step S56 is executed. When the determination result in step S55 is negative, the processes in steps S56 and S57 are skipped and the process in step S58 described later is executed.

In step S56, the processing section 211 updates the event management data stored in the first storage area (see step S10 in FIG. 11). Specifically, the processing section 211 updates the event management data corresponding to the pick-up event data determined in step S55 as having been received so that the event state information indicates "already occurred". Next to step S56, the process in step S57 is executed.

In step S57, the processing section 211 stores the event management data updated in step S56 into the second storage area under a certain condition. That is, the processing section 211 determines whether or not to store the event management data, according to the method described in the above "[3. Outline of processing in information processing system]", and when the determination result is positive, stores the event management data in the second storage area. In this case, if the number of event management data stored in the second storage area exceeds the aforementioned limit number, the processing section 211 deletes the event management data exceeding the limit number from the second storage area, starting from the oldest one. If the determination result is not to store the event management data, the processing section 211 does not store the event management data in the second storage area. Next to step S57, the process in step S58 is executed.

In step S58, the processing section 211 determines whether or not a notification reception request has been received from the game system 1 through the communication section 213. When the determination result in step S58 is positive, the process in step S59 is executed. When the determination result in step S58 is negative, the processes in steps S59 and S60 are skipped and the process in step S61 described later is executed.

In step S59, the processing section 211 generates an event state notification, and transmits, through the communication section 213, the event state notification to the game system 1 having transmitted the notification reception request (see step S13 in FIG. 11). Next to step S59, the process in step S60 is executed.

In step S60, the processing section 211 deletes, from the first storage area, the event management data that is related to the event state notification generated in the process in step S59 and indicates that the pick-up event has already occurred. Next to step S60, the process in step S61 is executed.

In step S61, the processing section 211 determines whether or not there is event management data, whose elapsed time from occurrence of the loss event has exceeded the aforementioned first preservation period, among the event management data stored in the first storage area. When the determination result in step S61 is positive, the process in step S62 is executed. When the determination result in step S61 is negative, the process in step S62 is skipped and the process in step S63 described later is executed.

In step S62, the processing section 211 deletes, from the first storage area, the event management data whose elapsed time from occurrence of the loss event has exceeded the first preservation period. Next to step S62, the process in step S63 is executed.

In step S63, the processing section 211 determines whether or not there is event management data whose elapsed time from occurrence of the pick-up event has exceeded the second preservation period. When the determination result in step S63 is positive, the process in step S64 is executed. When the determination result in step S63 is negative, the process in step S51 is executed again.

In step S64, the processing section 211 deletes, from the first storage area, the event management data whose elapsed time from occurrence of the pick-up event has exceeded the second preservation period. Next to step S64, the process in step S51 is executed again. Thereafter, in the server 201, a series of processes in steps S51 to S64 is repeatedly executed.

5. Function and Effect of Exemplary Embodiment, and Modifications

As described above, in the exemplary embodiment, the information processing system is configured to include at least a plurality of information processing apparatus (e.g., game systems 1, more specifically, main body apparatuses 2), and the server 201. In this configuration, each information processing apparatus performs processes as follows.

A process of executing game processing for controlling a player character in a virtual space, based on an operation input performed by a player (step S21).

A process of, when a first event (e.g., loss event) has occurred during a game, setting a state in which a property (e.g., item) of the player character is lost (step S23), and transmitting, to the server, first event data (e.g., own loss event data) including at least position information that is set based on a position, in the virtual space, at which the first event has occurred, and player information (e.g., item owner information) regarding the player.

A process of receiving, from the server, second event data (e.g., other loss event data) including at least the position information and the player information based on the first event data, of another player, transmitted from another information processing apparatus (step S29).

A process of performing setting so as to enable a second event (e.g., pick-up event) to occur based on an operation performed by the player, at a position, in the virtual space, which is set based on the position information included in the second event data (step S31).

A process of, based on the occurrence of the second event, transmitting third event data (e.g., pick-up event data) indicating that the second event has occurred, to the server (step S34).

Moreover, in the above configuration, the server performs processes as follows.

A process of storing, in a first storage area, event management data including at least the position information, the player information, and event state information, for each first event data received from an information processing apparatus, the event management data indicating whether the second event has already occurred or has not yet occurred (step S52).

A process of, when receiving the third event data from the information processing apparatus, updating the event state information in the event management data so as to indicate "already occurred" (step S56).

A process of storing, in a second storage area, at least any event management data in which the event state information indicates "already occurred" (step S57).

A process of, when receiving a second event data reception request from the information processing apparatus, transmitting at least one piece of second event data to the information processing apparatus (step S54). Here, the at least one piece of second event data includes the second event data based on the event management data which is stored in the first storage area and in which the event state information indicates "not yet occurred" and/or the second event data which is based on the event management data stored in the second storage area and is to be transmitted when said second event data is insufficient (FIG. 14).

In the above configuration, the information processing apparatus further executes a process as follows.

A process of communicating with the server, when the first event data has already been transmitted (steps S37 and S38), and performing a process of restoring at least a part of the property from the lost state, when the event state information in the event management data regarding the first event data indicates "already occurred" (step S40).

In the above configuration, the second event data based on the event management data in which the second event has already occurred is transmitted to the information processing apparatus together with the second event data based on the event management data in which the second event has not yet occurred. Since the former second event data is transmitted, it is possible to reduce the risk of inconvenience that a second event corresponding to a first event that has occurred in a certain information processing apparatus is not performed in another information processing apparatus and a property cannot be restored from its lost state. Moreover, since the latter second event data is transmitted, even if the number of first events that have occurred is small, opportunities of the second event to be performed in the information processing apparatus can be increased, thereby providing the players with sufficient opportunities of performing exchange between the games. Thus, in the above configuration, opportunities of the second event to be performed with respect to the first event can be ensured, thereby effectively providing the players with opportunities of performing exchange between the games.

The "player information" may be any information as long as a player can be identified by the information. For example, the player information may be the name or ID of the player himself/herself, or may be the name or ID of the player character operated by the player.

The "property" indicates any property possessed by a player character in a game. The "property" includes an item possessed by the player character, and money and points possessed by the player character and available in the game.

In the exemplary embodiment, the first event is an event in which a player character loses a property. In the exemplary embodiment, the second event is an event in which, at a position, in the virtual space, indicated by position information included in second event data received by an information processing apparatus, a player character corresponding to the information processing apparatus picks up a property that a player character of another player regarding the second event data has lost (i.e., picks up a lost item). Here, the first event may be any event of losing a property, and may be not only an event of losing a property but also an event that causes any demerit on the player character (e.g., an event that makes the player character unable to move). The second event may be not only an even of recovering the property but also an event that solves or reduces at least a part of the demerit caused by the first event (e.g., an event of rescuing the player character that cannot move).

In the exemplary embodiment, the first event (i.e., loss event) occurs when the health set on the player character is lost during the game. In the exemplary embodiment, since the second event data based on the event management data in which the second event has already occurred is transmitted to the information processing apparatus, even if the first event is less likely to occur in the game, opportunities of the second event to be performed in the information processing apparatus can be increased. In another embodiment, condition for the first event to occur is discretionary. For example, in the another embodiment, the condition may be that the property of the player character is stolen by an enemy character, or that the player character is caught in a trap arranged in the game field.

The phrase "when the second event data is insufficient" indicates a case where the second event data (based on the event management data, stored in the first storage area, in which the event state information indicates "not yet occurred") is 0 or less than a certain number. That is, the phrase "when the second event data is insufficient" includes (a) a case where the number of the second event data is 0, and (b) a case where, for example, when a predetermined number of second event data are to be transmitted as a whole, the number of second event data based on the event management data, stored in the first storage area, in which the event state information indicates "not yet occurred" is less than the predetermined number.

In the exemplary embodiment, when a process is being executed by using data (including a program) in a certain information processing apparatus, a part of the data used for the process may be transmitted from another information processing apparatus different from the certain information processing apparatus. In this case, the certain information processing apparatus may execute the process by using the data received from the another information processing apparatus and data stored therein.

In another embodiment, the information processing system may not include some of the components in the above embodiment, and may not execute some of the processes executed in the above embodiment. For example, in order to achieve a specific effect of a part of the above embodiment, the information processing system only needs to include a configuration for achieving the effect and execute a process for achieving the effect, and need not include other configurations and need not execute other processes.

The exemplary embodiment can be used as, for example, a game system and a game program, for the purpose of effectively providing players with opportunities of performing exchange between games.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. An information processing system, comprising:
at least a plurality of information processing apparatuses; and a server, wherein
each information processing apparatus is configured to:
- execute game processing for controlling a player character in a virtual space associated with a game, based on an operation input performed by a player;
- when a first event has occurred during the game:
  - set the player character in a state where the player character loses a property, and
  - transmit, to the server, first event data including at least position information and player information regarding the player, wherein the position information is set based on a location, in the virtual space, at which the first event has occurred;
- receive, from the server, second event data including at least the position information and the player information based on the first event data, of another player, transmitted from another information processing apparatus;
- enable a second event to occur based on an operation performed by the player, at a location, in the virtual space, which is set based on the position information included in the second event data; and
- based on the occurrence of the second event, transmit third event data indicating that the second event has occurred, to the server, wherein the server is configured to:
- store, in a first storage area, event management data including at least the position information, the player information, and event state information, for each first event data received from the information processing apparatus, wherein the event state information indicates whether the second event has already occurred or has not yet occurred;
- when receiving the third event data from the information processing apparatus, update the event state information in the event management data so as to indicate that the second event has already occurred;
- store, in a second storage area, at least any event management data in which the event state information indicates that the second event has already occurred; and
- when receiving a second event data reception request from the information processing apparatus, transmit at least one piece of the second event data to the information processing apparatus, wherein
the at least one piece of the second event data includes the second event data based on the event management data which is stored in the first storage area and in which the event state information indicates that the second event has not yet occurred, and/or the second event data which is based on the event management data stored in the second storage area and is to be transmitted when the second event data stored in the first storage area is insufficient, and
when the first event data has already been transmitted, the information processing apparatus communicates with the server, and when the event state information in the event management data regarding the first event data indicates that the second event has already occurred, the information processing apparatus performs a process of restoring at least a part of the property from the lost state.

2. The information processing system according to claim 1, wherein
the server is configured to perform a communication for notifying the information processing apparatus that a second event corresponding to the first event data transmitted by the information processing apparatus has already occurred, and thereafter, delete, from the first storage area, event management data regarding the first event data.

3. The information processing system according to claim 1, wherein
when the server has received the second event data reception request from the information processing apparatus, the server transmits at least a predetermined number of the second event data to the information processing apparatus.

4. The information processing system according to claim 1, wherein
when the server has received the second event data reception request from the information processing apparatus, if the event management data regarding a player who has made friend registration with the player of the information processing apparatus is stored in the first storage area, the server transmits, to the information processing apparatus, the at least one piece of the second event data including the second event data based on the event management data regarding the player who has made the friend registration.

5. The information processing system according to claim 4, wherein
when the server has received the second event data reception request from the information processing apparatus, if the event management data regarding the player who has made friend registration with the player of the information processing apparatus is stored in the first storage area, the server transmits, to the information processing apparatus, a first number, at maximum, of the second event data regarding the player who has made the friend registration, and transmits a second number of the second event data regarding a player different from the player who has made the friend registration.

6. The information processing system according to claim 1, wherein
when the server has received the second event data reception request from the information processing apparatus, the server transmits, to the information processing apparatus, the second event data based on at least one piece of event management data selected at random from among a plurality of pieces of the event management data which are stored in the first storage area and in which the event state information indicates that the second event has not yet occurred.

7. The information processing system according to claim 1, wherein
when the server has received the second event data reception request from the information processing apparatus, the server transmits, to the information processing apparatus, at least one piece of the second event data that is selected, in chronological order of storage into the server, from among a plurality of pieces of the event management data which are stored in the first storage area and in which the event state information indicates that the second event has not yet occurred.

8. The information processing system according to claim 1, wherein
the event management data further includes information regarding the player who has caused the second event, and
the server stores, as the information regarding the player who has causes the second event, information regarding a player of the information processing apparatus that has firstly transmitted the third event data to the server.

9. The information processing system according to claim 1, wherein
the second event data further includes the event state information, and
when the second event has occurred and the event state information of the second event data associated with the second event indicates that the second event has not yet occurred, the information processing apparatus transmits the third event data to the server.

10. The information processing system according to claim 1, wherein
the first event is an event in which the player character loses the property.

11. The information processing system according to claim 10, wherein
the second event is an event in which, at a location, in the virtual space, indicated by the position information included in the second event data received by the information processing apparatus, the player character corresponding to the information processing apparatus picks up a property that the player character of the another player regarding the second event data has lost.

12. The information processing system according to claim 1, wherein
the first event occurs when health set on the player character is lost.

13. A server configured to communicate with a plurality of information processing apparatuses each executing game processing, the server comprising:
a processor; and
a memory storing computer readable instructions that, when executed by the processor, cause the server to
receive, from at least any of the information processing apparatuses, first event data including at least position information and player information regarding a player of the game, wherein the position information is set based on a location, in a virtual space, at which a first event has occurred during a game;
store, in a first storage area, event management data including at least the position information, the player information, and event state information, for each first event data received from the information processing apparatus, wherein the event state information indicates whether a second event, which occurs in relation to the first event in another information processing apparatus different from the information processing apparatus in which the first event has occurred, has already occurred or has not yet occurred;
when receiving a request from the information processing apparatus, transmit, to the information processing apparatus, at least one piece of the second event data including at least the position information and the player information based on the event management data; and
receive, from the information processing apparatus, third event data indicating that the second event has occurred in a game executed in the information processing apparatus at a location, in the virtual space, which is set based on the position information included in the second event data, and upon receiving the third event data, update the event state information in the event management data so as to indicate that the second event has already occurred, wherein
the server further stores, in a second storage area, at least any event management data in which the event state information indicates that the second event has already occurred,
the server communicates with the information processing apparatus that has already transmitted the first event data, and transmits at least information indicating whether or not the event state information in the event management data regarding the first event data indicates that the second event has already occurred, and
the at least one piece of the second event data includes the second event data based on the event management data which is stored in the first storage area and in which the event state information indicates that the second event has not yet occurred, and/or the second event data which is based on the event management data stored in the second storage area and is to be transmitted when the second event data stored in the first storage area is insufficient.

14. The server according to claim 13, wherein
the server is configured to perform a communication for notifying the information processing apparatus that a second event corresponding to the first event data transmitted by the information processing apparatus has already occurred, and thereafter, delete, from the first storage area, event management data regarding the first event data.

15. The server according to claim 13, wherein
when the server has received a second event data reception request from the information processing apparatus, the server transmits at least a predetermined number of the second event data to the information processing apparatus.

16. The server according to claim 13, wherein
when the server has received the second event data reception request from the information processing apparatus, if the event management data regarding a player who has made friend registration with the player of the information processing apparatus is stored in the first storage area, the server transmits, to the information processing apparatus, the at least one piece of the second event data including the second event data based on the event management data regarding the player who has made the friend registration.

17. The server according to claim 16, wherein
when the server has received the second event data reception request from the information processing apparatus, if the event management data regarding the player who has made friend registration with the player of the information processing apparatus is stored in the first storage area, the server transmits, to the information processing apparatus, a first number, at maximum, of the second event data regarding the player who has made the friend registration, and transmits a second number of the second event data regarding a player different from the player who has made the friend registration.

18. The server according to claim 13, wherein
when the server has received the second event data reception request from the information processing apparatus, the server transmits, to the information processing apparatus, the second event data based on at least one piece of event management data which is selected at random from among a plurality of pieces of the event management data which are stored in the first storage area and in which the event state information indicates that the second event has not yet occurred.

19. The server according to claim 13, wherein
when the server has received the second event data reception request from the information processing apparatus, the server transmits, to the information processing apparatus, at least one pieces of the second event data which is selected, in chronological order of storage into the server, from among a plurality of pieces of the event management data which are stored in the first storage area and in which the event state information indicates that the second event has not yet occurred.

20. The server according to claim 13, wherein
the event management data further includes information regarding the player who has caused the second event, and
the server stores, as the information regarding the player who has caused the second event, information regarding a player of the information processing apparatus that has firstly transmitted the third event data to the server.

21. The server according to claim 13, wherein
the second event data further includes the event state information, and
when the second event has occurred in the information processing apparatus and the event state information of the second event data associated with the second event indicates that the second event has not yet occurred, the server transmits the third event data to the information processing apparatus.

22. The server according to claim 13, wherein
the first event is an event in which the player character loses the property.

23. The server according to claim 22, wherein
the second event is an event in which, at a location, in the virtual space, indicated by the position information included in the second event data received by the information processing apparatus, the player character corresponding to the information processing apparatus picks up a property that a player character of the another player regarding the second event data has lost.

24. The server according to claim 13, wherein
the first event occurs when health set on the player character is lost.

25. An information processing method executed in an information processing system including at least a plurality of information processing apparatuses and a server, the method comprising:
executing game processing for controlling a player character in a virtual space, based on an operation input performed by a player;
in association with a first event occurring during a game:
setting the player character in a state where the player character loses a property, and
transmitting, to the server, first event data including at least position information and player information regarding the player, wherein the position information is set based on a location, in the virtual space, at which the first event has occurred;
receiving, from the server, second event data including at least the position information and the player information based on the first event data, of another player, transmitted from another information processing apparatus;
enabling a second event to occur based on an operation performed by the player, at a location, in the virtual space, which is set based on the position information included in the second event data; and
based on the occurrence of the second event, transmitting third event data indicating that the second event has occurred, to the server;
storing, in a first storage area, event management data including at least the position information, the player information, and event state information, for each first event data received from the information processing apparatus, wherein the event state information indicates whether the second event has already occurred or has not yet occurred;
in association with receiving the third event data from the information processing apparatus, updating the event state information in the event management data so as to indicate that the second event has already occurred;
storing, in a second storage area, at least any event management data in which the event state information indicates that the second event has already occurred; and
in association with receiving a second event data reception request from the information processing apparatus, transmitting at least one piece of the second event data to the information processing apparatus, wherein
the at least one piece of the second event data includes the second event data based on the event management data which is stored in the first storage area and in which the event state information indicates that the second event has not yet occurred, and/or the second event data which is based on the event management data stored in the second storage area and is to be transmitted when the second event data stored in the first storage area is insufficient, and
in association with the first event data having already been transmitted, the information processing apparatus communicates with the server, and in association with the event state information in the event management data regarding the first event data indicating that the second event has already occurred, the information processing apparatus performs a process of restoring at least a part of the property from the lost state.

26. The information processing method according to claim 25, further comprising:
performing a communication for notifying the information processing apparatus that a second event corresponding to the first event data transmitted by the information processing apparatus has already occurred, and thereafter, deleting, from the first storage area, event management data regarding the first event data.

27. The information processing method according to claim 25, wherein
in association with the server having received the second event data reception request from the information processing apparatus, the server transmits at least a predetermined number of the second event data to the information processing apparatus.

28. The information processing method according to claim 25, wherein
in association with the server having received the second event data reception request from the information processing apparatus, if the event management data regarding a player who has made friend registration with the player of the information processing apparatus is stored in the first storage area, the server transmits, to the information processing apparatus, the at least one piece of the second event data including the second event data based on the event management data regarding the player who has made the friend registration.

29. The information processing method according to claim 28, wherein
in association with the server having received the second event data reception request from the information processing apparatus, if the event management data regarding the player who has made friend registration with the player of the information processing apparatus is stored in the first storage area, the server transmits, to the information processing apparatus, a first number, at maximum, of the second event data regarding the player who has made the friend registration, and transmits a second number of the second event data regarding a player different from the player who has made the friend registration.

30. The information processing method according to claim 25, wherein
in association with the server having received the second event data reception request from the information processing apparatus, the server transmits, to the information processing apparatus, the second event data based on at least one piece of event management data selected at random from among a plurality of pieces of the event management data which are stored in the first storage area and in which the event state information indicates that the second event has not yet occurred.

31. The information processing method according to claim 25, wherein
in association with the server having received the second event data reception request from the information processing apparatus, the server transmits, to the information processing apparatus, at least one piece of the second event data that is selected, in chronological order of storage into the server, from among a plurality of pieces of the event management data which are stored in the first storage area and in which the event state information indicates that the second event has not yet occurred.

32. The information processing method according to claim 25, wherein
the event management data further includes information regarding the player who has caused the second event, and
the server stores, as the information regarding the player who has causes the second event, information regarding a player of the information processing apparatus that has firstly transmitted the third event data to the server.

33. The information processing method according to claim 25, wherein
the second event data further includes the event state information, and
in association with the second event having occurred and the event state information of the second event data associated with the second event indicates that the second event has not yet occurred, the information processing apparatus transmits the third event data to the server.

34. The information processing method according to claim 25, wherein
the first event is an event in which the player character loses the property.

35. The information processing method according to claim 34, wherein
the second event is an event in which, at a location, in the virtual space, indicated by the position information included in the second event data received by the information processing apparatus, the player character corresponding to the information processing apparatus picks up a property that the player character of the another player regarding the second event data has lost.

36. The information processing method according to claim 25, wherein
the first event occurs when health set on the player character is lost.

* * * * *